US012627428B2

(12) United States Patent
Fang et al.

(10) Patent No.: US 12,627,428 B2
(45) Date of Patent: May 12, 2026

(54) A-MPDU PREEMPTION FOR TIME-CRITICAL ULTRA-LOW LATENCY (ULL) COMMUNICATIONS

(71) Applicant: Intel Corporation, Santa Clara, CA (US)

(72) Inventors: Juan Fang, Portland, OR (US);
Minyoung Park, San Ramon, CA (US);
Laurent Cariou, Milizac (FR);
Qinghua Li, San Ramon, CA (US);
Dmitry Akhmetov, Hillsboro, OR (US); Xiaogang Chen, Portland, OR (US); Dave A. Cavalcanti, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/899,958

(22) Filed: Aug. 31, 2022

(65) Prior Publication Data

US 2022/0416964 A1      Dec. 29, 2022

(51) Int. Cl.
*H04L 5/00*          (2006.01)

(52) U.S. Cl.
CPC .......... *H04L 5/0044* (2013.01); *H04L 5/0064* (2013.01)

(58) Field of Classification Search
CPC .......................... H04L 5/0044; H04L 5/0064
See application file for complete search history.

(56) References Cited

U.S. PATENT DOCUMENTS

| | | | | |
|---|---|---|---|---|
| 2016/0088604 A1* | 3/2016 | Patel | ................ | H04W 72/0446 |
| | | | | 370/336 |
| 2018/0063749 A1* | 3/2018 | Islam | .................... | H04L 1/1893 |
| 2019/0045508 A1* | 2/2019 | Cariou | ............. | H04W 72/0446 |
| 2020/0267636 A1 | 8/2020 | Cavalcanti et al. | | |
| 2022/0124746 A1* | 4/2022 | Azizi | ................ | H04W 52/0216 |

FOREIGN PATENT DOCUMENTS

| | | |
|---|---|---|
| WO | WO-2019125396 A1 | 6/2019 |
| WO | WO-2019236052 A1 | 12/2019 |

* cited by examiner

*Primary Examiner* — Won Tae C Kim
(74) *Attorney, Agent, or Firm* — Schwegman Lundberg & Woessner, P.A.

(57) ABSTRACT

Embodiments disclosed herein are directed to communicating time-critical ultra-low latency (ULL) data. An access point station (AP) communicates time-critical ULL data using aggregated MAC Protocol Data Unit (A-MPDU) preemption. When time-critical ULL data for a second associated STA (STA2) becomes available at a medium access control (MAC) layer of the AP during transmission of a physical layer protocol data unit (PPDU) to a first associate station (STA1), the AP may encode the time-critical ULL data in a new A-MPDU subframe for insertion before one of the A-MPDU subframes of the PPDU that has not yet been transmitted. The new A-MPDU subframe may be encoded to include zero-padding to set a size of the new A-MPDU subframe equal to a size of the A-MPDU subframe that has been preempted. The A-MPDU subframes 606 for STA1 may be encoded include a MAC address of the STA1 and the new A-MPDU subframe 608 may be encoded include a MAC address of the STA2.

18 Claims, 10 Drawing Sheets

EHT MU PPDU Format

EHT TB PPDU format

A-MPDU PREEMPTION FOR TIME-CRITICAL ULTRA-LOW LATENCY (ULL) COMMUNICATIONS

TECHNICAL FIELD

Embodiments pertain to wireless communications. Some embodiments relate to wireless networks including wireless local area networks (WLANS) including those operating in accordance with the IEEE 802.11 standards. Some embodiments relate to wireless time-sensitive networks (TSN) and wireless time-sensitive networking (WTSN). Some embodiments pertain to time-critical ultra-low latency (ULL) data communication.

BACKGROUND

One issue with communicating data over a wireless network is Emerging time-sensitive (TS) applications represent new markets for Wi-Fi. Industrial automation, robotics, AR/VR and HMIs (Human-Machine Interface) are example applications. Many time-sensitive applications require ultra-low latency (ULL) with minimal queuing and medium access delay within a wireless system. For instance, Programable Logic Controller (PLCs) may execute control loops requiring isochronous (cyclic) transmission of small time-critical (TC) packets (typically a few bytes) with cycles of 10's of microseconds. Furthermore, applications that need ULL typically also require very high reliability. The ULL requirement for TC packets practically imposes very high reliability requirements as multiple retransmissions (following the typical Wi-Fi protocols) are not feasible.

Although IEEE 802.11ax has introduced triggered-based OFDMA operation, the overhead involved in the basic trigger-based data exchange within a TXOP is high, especially for small packet sizes. Many time-sensitive applications involve isochronous (cyclic) transmission of small packets (typically a few bytes) within very short cycles with high reliability.

Thus what is needed are communication techniques suitable for time-sensitive applications that require lower overhead and are compatible with legacy network communications (i.e., IEEE 802.11ax and previous versions of the 802.11 standard). Thus, what is also needed is improved techniques to communicate time-critical ULL data.

DETAILED DESCRIPTION

Figure 1A:
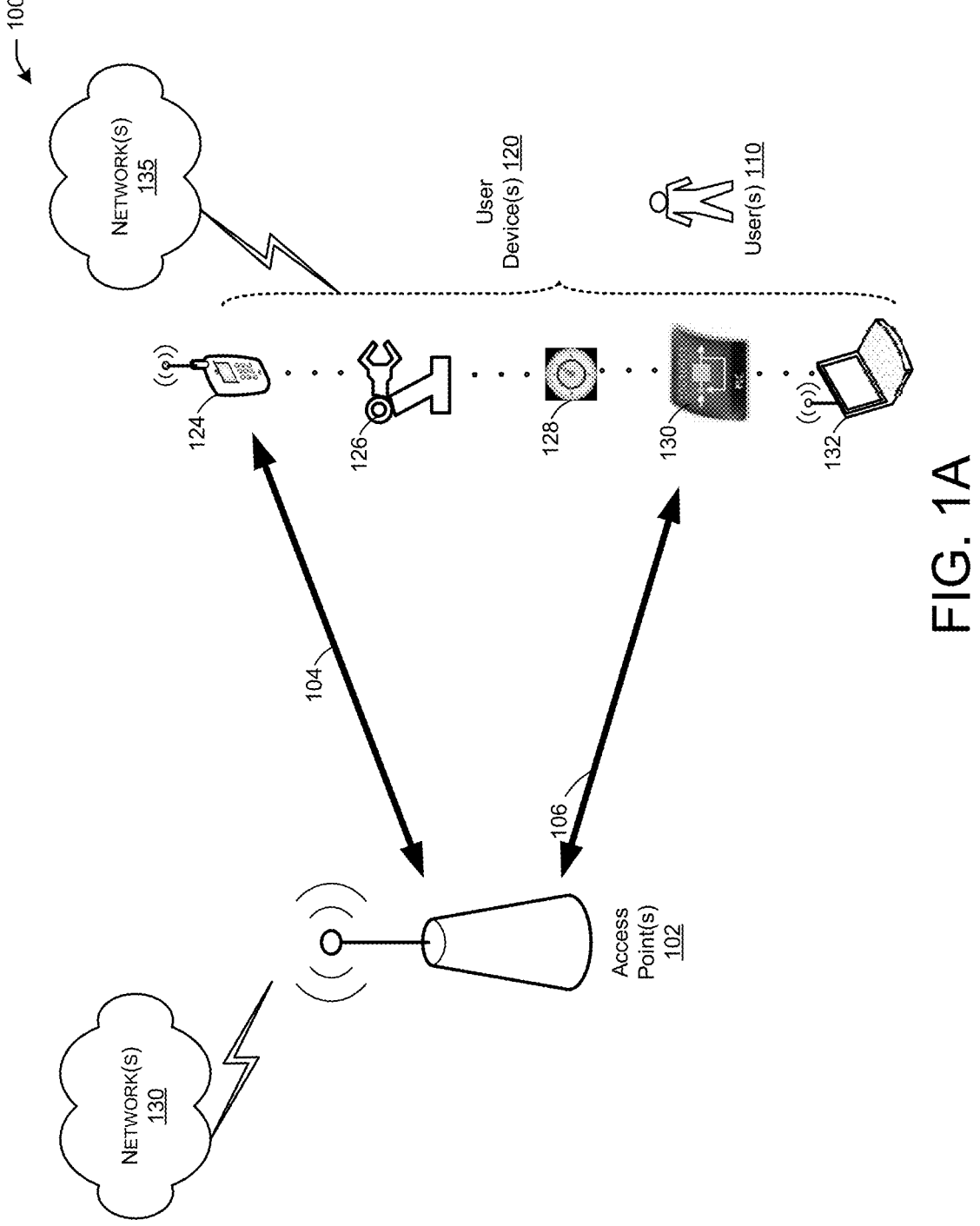
FIG. 1A illustrates an example network, in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Embodiments disclosed herein are directed to communicating time-critical ultra-low latency (ULL) data. In some embodiments, an access point station (AP) communicates time-critical ULL data using aggregated MAC Protocol Data Unit (A-MPDU) preemption. In these embodiments, when time-critical ULL data for a second associated STA (STA2) becomes available at a medium access control (MAC) layer of the AP during transmission of a physical layer protocol data unit (PPDU) to a first associate station (STA1), the AP may encode the time-critical ULL data in a new A-MPDU subframe for insertion before one of the A-MPDU subframes of the PPDU that has not yet been transmitted. In some of these embodiments, the new A-MPDU subframe may be encoded to include zero-padding to set a size of the new A-MPDU subframe equal to a size of the A-MPDU subframe that has been preempted. In some of these embodiments, the A-MPDU subframes 606 for STA1 may be encoded include a MAC address of the STA1 and the new A-MPDU subframe 608 may be encoded include a MAC address of the STA2. These embodiments, as well as others, are described in more detail herein.

Reliable and deterministic communications between devices may be required in some circumstances. One example may be time sensitive networking (TSN). TSN applications may require very low and bounded transmission latency and high availability and may include a mix of traffic patterns and requirements from synchronous data flows (e.g., from sensors to a controller in a closed loop control system), to asynchronous events (e.g., a sensor detecting an anomaly in a monitored process and sending a report right away), to video streaming for remote asset monitoring and background IT/office traffic. Many TSN applications also may require communication between devices with ultra-low latency (e.g., on the order of tens of microseconds).

Autonomous systems, smart factories, professional audio/video, and mobile virtual reality are examples of time sensitive applications that may require low and deterministic latency with high reliability. Deterministic latency/reliability may be difficult to achieve with existing Wi-Fi standards (e.g., the IEEE 802.11 family of standards), which may focus on improving peak user throughput (e.g., the IEEE 802.11ac standard) and efficiency (e.g., the IEEE 802.11ax standard). Extending the application of Wi-Fi beyond consumer-grade applications to provide wireless TSN (WTSN) performance presents an opportunity to apply Wi-Fi to Internet of things (IOT), and new consumer markets (e.g., wireless virtual reality). The non-deterministic nature of the IEEE 802.11 medium access control (MAC) layer in an unlicensed spectrum may impose challenges to expanding the application of Wi-Fi in this manner, especially when trying to guarantee reliability in comparison to Ethernet TSN applications.

It may be desirable to enable time-synchronized and scheduled MAC layer communications to facilitate time sensitive transmissions over Wi-Fi. The MAC may benefit from a more flexible control/management mechanism to adapt scheduling and/or transmission parameters (e.g., adapt a modulation and coding scheme and increase power) to control latency and to increase reliability. For example, changes in a wireless channel, such as interference or fading, may trigger retransmissions, which may impact the latency for time sensitive data due to increased channel throughput. An access point (AP) may update station (STA) transmission parameters to increase reliability (e.g., increase transmission power), which may require a transmission schedule update. An AP may also reduce a number of STAs that share a given service period to provide more capacity for retransmissions within a maximum required latency. Another example may include high-priority data (e.g., random alarms/events in an industrial control system), which may need to be reported with minimal latency, but cannot be scheduled a priori. Although regular beacons may be used to communicate scheduling and other control/management updates, it may be desirable to have a more deterministic and flexible control mechanism in future Wi-Fi networks that may enable faster management/scheduling of a wireless channel to facilitate time sensitive applications with high reliability and efficiency.

It may also be desirable to ensure that devices in a network or extended service set (ESS) receive schedule updates and maintain a synchronized schedule. Once a time sensitive transmission schedule is updated, all devices may need to receive the updated schedule before the schedule may become applicable, otherwise the updated schedule may not be reliable (e.g., not all devices may properly follow the schedule). To meet the requirements of time sensitive traffic, it may be desirable to ensure that all relevant devices comply with schedule updates regardless of active and sleep states of the devices.

To enable synchronization and scheduling, control/management frames may be used. Control/management frames may share a channel with data frames. It may be desirable, however, to have a dedicated channel for control/management frames that may be separate from a data channel. In addition, it may be desirable to have mechanisms to enable dynamic control/management actions using controlled latency and high reliability. Something other than beacon transmissions by themselves may be beneficial to enable dynamic and fast updates to operations required to maintain a quality of service for time sensitive applications.

To support such WTSN operations, it may be beneficial to redesign the MAC layer and physical layer (PHY) to improve efficiency and performance without needing to consider legacy behaviors or support backward compatibility while being able to coexist with legacy devices. A greenfield mode may refer to a device that assumes that there are no legacy (e.g., operating under previous protocol rules) stations (STAs) using the same channel. Thus, a device operating with a greenfield mode may operate under an assumption that all other STAs follow the same (e.g., newest) protocols, and that no legacy STAs are competing for the same channel access. In some embodiments, an STA operating with a greenfield mode may at least assume that any legacy STAs that may exist may be managed to operate in a separate channel and/or time. However, operations with multiple access points (APs) may experience interference, latency, and/or other performance issues. For example, APs may not all be aware of what other APs and STAs may be doing. Therefore, it may be desirable to define a greenfield Wi-Fi operation in a 6-7 GHz band or another frequency band, and thereby enable a time synchronized scheduled access mode for multiple APs in the 6-7 GHz band or other existing frequency bands (e.g., 2.4 GHz, 5 GHz) of future Wi-Fi generations.

The design of a greenfield air interface may be governed by significant reliability and latency constraints imposed by WTSN operations. It may therefore be desirable to efficiently design MAC and PHY communications to support WTSN applications. Legacy MAC/PHY operations may be asynchronous and may apply contention-based channel access and may require significant overhead for backward compatibility that may be important for devices to coexist in unlicensed frequency bands. Such legacy MAC/PHY operations may be too inefficient to support time sensitive applications, especially as such traffic increases, but they may still be used for non-time sensitive data or control traffic (e.g. in a legacy control channel).

While contention-free channel access mechanisms exist (e.g., point coordination function, hybrid coordination function controlled channel access), such mechanisms may lack the predictability required to support WTSN operations, as the mechanisms may be stacked on a distributed coordination function and may use polling operations with significant overhead and other inefficient steps.

Device synchronization may use transmissions with significant overhead. For example, PHY headers may be included in some or all transmissions between devices. For example, data frames and acknowledgement (ACK) frames may use legacy preambles that make the frames longer, reducing the number of transmissions that may be accomplished during a transmission opportunity (TXOP). Synchronization that occurs up front (e.g., at the start of a TXOP) may allow for reduced overhead in subsequent transmissions, and therefore may reduce the resources required for some transmissions and may allow for more throughput and lower latency in a channel.

Example embodiments of the present disclosure relate to systems, methods, and devices for enhanced time sensitive networking for wireless communications. In some embodiments, time sensitive control and data channel operations may be enabled for IEEE 802.11 standards, including for future generations of IEEE 802.11 standards (e.g., beyond IEEE 802.11ax, including 6-7 GHz communication bands, and/or in deployments in which it may be feasible to enable channel/band steering of an STA with time sensitive requirements, such as in managed private networks.

In some embodiments, control information may be updated (e.g., using scheduling) without interfering with time sensitive data, ensuring latency and reliability guarantees. For example, a time sensitive data transmission may be needed, and control information such as transmission schedules may also need to be updated to facilitate subsequent transmission. The control information updates may be sent and implemented without interfering with the time sensitive data transmissions.

In some embodiments, a time sensitive control channel (TSCCH) may be defined by combining two approaches: a periodic approach and an on-demand approach. The period approach may include predefined control slots. In the on-demand approach, an AP may define control slots as needed. A TSCCH access mechanism may use contention-based or time synchronized scheduled access procedures. Also, a wake-up signal may be used to allow delivery of time sensitive control/management information to STAs across a network, reducing latency and allowing power save modes for the STAs.

In some embodiments, a TSCCH may be in a different physical/logical channel from a data transmission. For example, a data transmission may use a data channel (e.g., in a 6-7 GHz band) while TSCCH may use separate control channel in another band (e.g., 2.4 GHz or 5 GHz).

In some embodiments, use of a TSCCH operation and access mechanism may allow improved flexibility and more deterministic opportunities for an AP to provide timely updates (e.g., schedules and control parameters) needed to manage latency and reliability, which may be beneficial in supporting time sensitive applications.

In some embodiments, a greenfield operation deployed in existing or new frequency bands (e.g., 6-7 GHz) and other managed networks may facilitate improved management of Wi-Fi networks operating in scheduled modes with time sensitive operations.

In some embodiments, it may be assumed that a Wi-Fi network may be managed and that there are no unmanaged nearby Wi-Fi STAs or networks. This assumption may be reasonable for time sensitive applications.

In some embodiments, it may be assumed that APs and STAs may synchronize their clocks to a master reference time. For example, STAs may synchronize to beacons and/or may use time synchronization protocols (e.g., as defined by the IEEE 802.1AS standard or other synchronization capabilities defined in the 802.11 standard).

In one or embodiments, it may be assumed that an AP may define a time-synchronized scheduled mode. In some embodiments, a greenfield mode may apply to a 6-7 GHz frequency band, and the greenfield mode may apply to other bands (e.g., 2.4 GHz, 5 GHz) where support for legacy devices may not be required (e.g., in some private networks). A greenfield mode may be applied according to the following principles.

In some embodiments, a fully synchronized and scheduled operation may be defined for a self-contained/synchronized transmission opportunity (S-TXOP) that may include a series of both uplink and downlink transmissions. During an S-TXOP, an AP may maintain control of a medium and may schedule access across predefined deterministic time boundaries. The use of an S-TXOP may maximize an amount of TSN traffic served while providing latency and reliability guarantees that support time sensitive operations with high efficiency.

In some embodiments, communication overheads related to synchronization, channel measurement and feedback, scheduling, and resource allocation may be intelligently packed at the beginning of an S-TXOP and may allow subsequent data transmissions to be extremely lightweight with minimal overhead. For example, up-front synchronization may allow for devices to be configured so that the devices do not need as much information as is currently provided in legacy headers. Instead, headers may be shorter because an S-TXOP has been coordinated among devices. The reduced overhead may allow for more TSN traffic to be served while providing sufficient latency and reliability of transmissions.

In some embodiments, there may be flexibility to define deterministic communication boundaries within an S-TXOP to accommodate applications requiring latency bounds in a sub-millisecond range, or other tight time ranges, for example.

In some embodiments, a multi-band framework may be leveraged to allow backward compatibility and coexistence with legacy Wi-Fi applications. A new greenfield mode as defined herein may be used for data communications, and minimal control may be required to sustain target latency, reliability, and throughput performance. Legacy modes and bands may be used to perform basic/long-term control and management tasks (e.g., non-time sensitive tasks) as well as time sensitive tasks.

In some embodiments, to reduce overhead for coexistence, a first transmission in an S-TXOP may include a legacy preamble to enable coexistence with legacy devices.

In some embodiments, enhanced time sensitive networking may improve performance over some existing wireless communications. For example, efficiency and latency may be improved, and the enhanced time sensitive networking may support a larger number of STAs for a given wireless resource while meeting latency bounds for TSN applications. (e.g., augmented virtual reality, industrial control, and autonomous systems). Enhanced time sensitive networking may allow coexistence with legacy Wi-Fi operations by leveraging multi-band devices. Coexistence across networks operating in a greenfield mode as defined herein may be allowed by having better management and coordination across basic service sets (BSSs), which may be facilitated by higher layer management/coordination protocols.

In some embodiments, a number of assumptions may be used for the greenfield mode of enhanced time sensitive networking. In some embodiments, WTSN STAs may be multi-band devices in which the MAC/PHY may operate in a different band (e.g., 6-7 GHz) than the band of a legacy STA, which may operate in 2.4 GHz or 5 GHz bands.

In some embodiments, a fully managed Wi-Fi deployment scenario in which other radio technology (e.g., legacy Wi-Fi or cellular) may not be expected to operate in a same band where a WTSN STA may be operating. In some embodiments, the enhanced time sensitive networking may be used in an indoor operating environment with relatively low mobility.

In some embodiments, a packet belonging to a TSN-grade application when queued at a WTSN STA may be dropped at a transmitter side if the packet does not get into air within a certain latency bound time.

The above descriptions are for purposes of illustration and are not meant to be limiting. Numerous other examples, configurations, processes, etc., may exist, some of which are described in detail below. Example embodiments will now be described with reference to the accompanying figures.

FIG. 1A is a diagram illustrating an example network environment, in accordance with some embodiments. Wireless network 100 may include one or more user devices 120 and one or more access point(s) (APs) 102, which may communicate in accordance with and compliant with various communication standards and protocols, such as, Wi-Fi, TSN, Wireless USB, P2P, Bluetooth, NFC, or any other communication standard. The user device(s) 120 may be mobile devices that are non-stationary (e.g., not having fixed locations) or may be stationary devices.

In some embodiments, the user devices 120 and AP 102 may include one or more computer systems similar to that of the functional diagram of FIG. 9. One or more illustrative user device(s) 120 and/or AP 102 may be operable by one or more user(s) 108. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP 102 may operate as a personal basic service set (PBSS) control point/access point (PCP/AP). The user device(s) 120 (e.g., 124, 126, or 128) and/or AP 102 may include any suitable processor-driven device including, but not limited to, a mobile device or a non-mobile, e.g., a static, device. For example, user device(s) 120 and/or AP 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an ultrabook™ computer, a notebook computer, a tablet computer, a server computer, a handheld computer, a handheld device, an internet of things (IoT) device, a sensor device, a robotic device, an actuator, a robotic arm, an industrial robotic device, a programmable logic controller (PLC), a safety controller and monitoring device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

Any of the user device(s) 120 (e.g., user devices 124, 126, 128, 130, and 132), and AP 102 may be configured to communicate with each other via one or more communications networks 135 and/or 140 wirelessly or wired. The user device(s) 120 may also communicate peer-to-peer or directly with each other with or without the AP 102. Any of the communications networks 135 and/or 140 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 135 and/or 140 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 135 and/or 140 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128, 130, and 132) and AP 102 may include one or more communications antennas. The one or more communications antennas may be any suitable type of antennas corresponding to the communications protocols used by the user device(s) 120 (e.g., user devices 124, 126, 128, 130, and 132), and AP 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP 102.

Any of the user device(s) 120 (e.g., user devices 124, 126, 128, 130, and 132), and AP 102 may be configured to perform directional transmission and/or directional reception in conjunction with wirelessly communicating in a wireless network. Any of the user device(s) 120 (e.g., user devices 124, 126, 128, 130, and 132), and AP 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128, 130, and 132), and AP 102 may be configured to perform any given directional transmission towards one or more defined transmit sectors. Any of the user device(s) 120 (e.g., user devices 124, 126, 128, 130, and 132), and AP 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP 102 may be configured to use all or a subset of its one or more communications antennas to perform MIMO beamforming.

Any of the user devices 120 (e.g., user devices 124, 126, 128, 130, and 132), and AP 102 may include any suitable radio and/or transceiver for transmitting and/or receiving radio frequency (RF) signals in the bandwidth and/or channels corresponding to the communications protocols utilized by any of the user device(s) 120 and AP 102 to communicate with each other. The radio components may include hardware and/or software to modulate and/or demodulate communications signals according to pre-established transmission protocols. The radio components may further have hardware and/or software instructions to communicate via one or more communication standards and protocols, such as, Wi-Fi, TSN, Wireless USB, Wi-Fi P2P, Bluetooth, NFC, or any other communication standard. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHZ channels (e.g. 802.11ad). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

When an AP (e.g., AP 102) establishes communication with one or more user devices 120 (e.g., user devices 124, 126, 128, 130 and/or 132), the AP 102 may communicate in a downlink direction and the user devices 120 may communicate with the AP 102 in an uplink direction by sending frames in either direction. The user devices 120 may also communicate peer-to-peer or directly with each other with or without the AP 102. The data frames may be preceded by one or more preambles that may be part of one or more headers. These preambles may be used to allow a device (e.g., AP 102 and/or user devices 120) to detect a new incoming data frame from another device. A preamble may be a signal used in network communications to synchronize transmission timing between two or more devices (e.g., between the APs and user devices).

In some embodiments, and with reference to FIG. 1A, an AP 102 may communicate with user devices 120. The user devices 120 may include one or more wireless devices (e.g., user devices 124, 132) and one or more wireless TSN devices (e.g., user devices 126 128, 130). The user devices may access a channel in accordance with medium access control (MAC) protocol rules or any other access rules (e.g., Wi-Fi, Bluetooth, NFC, etc.). It should be noted that reserving a dedicated TSN channel and controlling access to it may also be applicable to cellular systems/3GPP networks, such as LTE, 5G, or any other wireless networks. The wireless TSN devices may also access a channel according to the same or modified protocol rules. However, the AP 102 may dedicate certain channels or sub-channels for TSN applications that may be needed by the one or more wireless TSN devices (e.g., user devices 126, 128, and 130), and may allocate other channels or sub-channels for the non-TSN devices (e.g., user devices 124 and 132).

In some embodiments, AP 102 may also define one or more access rules associated with the dedicated channels. A channel may be dedicated for TSN transmissions, TSN applications, and TSN devices. For example, user device 126 may access a dedicated TSN channel for TSN transmissions. TSN transmissions may include transmissions that have very low transmission latency and high availability requirements. Further, the TSN transmissions may include synchronous TSN data flows between sensors, actuators, controllers, robots, in a closed loop control system. The TSN transmissions require reliable and deterministic communications. A channel may be accessed by the user device 126 for a number of TSN message flows and is not limited to only one TSN message flow. The TSN message flows may depend on the type of application messages that are being transmitted between the AP 102 and the user device 126.

In some embodiments, while frequency planning and channel management may be used to allow AP 102 to collaborate with neighboring APs (not shown) to operate in different channels, the efficiency and feasibility of reserving multiple non-overlapping data channels for time sensitive applications may be improved. It may be desirable to limit the amount of resources reserved for time sensitive data through efficient channel reuse. If multiple devices (e.g., user devices 124, 126, 128, 130, 132) share a dedicated channel for time sensitive data transmissions, interference among multiple transmissions may be reduced with enhanced coordination between the devices and one or more APs (e.g., AP 102). For example, overlap and interference of control transmissions (e.g., a beacon), downlink data transmissions, and uplink data transmissions may be reduced with enhanced coordination. Such enhanced coordination for multiple APs may enable more efficient channel usage while also meeting latency and reliability requirements of time sensitive applications. For example, if control transmissions are not received and interpreted properly, time sensitive operations may not be scheduled properly, and/or may interfere with other transmissions, possibly causing operational errors.

In some embodiments, AP 102 may include WTSN controller functionality (e.g., a wireless TSN controller capability), which may facilitate enhanced coordination among multiple devices (e.g., user devices 124, 126, 128, 130, 132). AP 102 may be responsible for configuring and scheduling time sensitive control and data operations across the devices. A wireless TSN (WTSN) management protocol may be used to facilitate enhanced coordination between the devices, which may be referred to as WTSN management clients in such context. AP 102 may enable device admission control (e.g., control over admitting devices to a WTSN), joint scheduling, network measurements, and other operations.

In some embodiments, AP 102's use of WTSN controller functionality may facilitate AP synchronization and alignment for control and data transmissions to ensure latency with high reliability for time sensitive applications on a shared time sensitive data channel, while enabling coexistence with non-time sensitive traffic in the same network.

In some embodiments, AP 102 and its WTSN coordination may be adopted in future Wi-Fi standards for new bands (e.g., 6-7 GHz), in which additional requirements of time synchronization and scheduled operations may be used. Such application of the WTSN controller functionality may be used in managed Wi-Fi deployments (e.g., enterprise, industrial, managed home networks, etc.) in which time sensitive traffic may be steered to a dedicated channel in existing bands as well as new bands.

In some embodiments, it may be assumed that a Wi-Fi network may be managed, and that there are no unmanaged Wi-Fi STAs/networks nearby.

In some embodiments, it may be assumed that APs and STAs may synchronize their clocks to a master reference times (e.g., STAs may synchronize to beacons and/or may use time synchronization protocols as defined in the IEEE 802.1AS standard).

In some embodiments, it may be assumed that APs and STAs may operate according to a time synchronized scheduled mode that may also apply to new frequency bands (e.g., 6-7 GHz), for which new access protocols and requirements also may be proposed.

In some embodiments, a WTSN domain may be defined as a set of APs (e.g., AP 102) and STAs (e.g., user devices 124, 126, 128, 130, and 132) that may share dedicated wireless resources, and therefore may need to operate in close coordination, at a level of control and time sensitive data scheduling, to ensure latency and reliability guarantees. Different APs in the same network may form different WTSN domains.

In some embodiments, the WTSN management protocol may be executed over a wired (e.g., Ethernet) TSN infrastructure that may provide TSN grade time synchronization accuracy and latency guarantees. The WTSN management protocol may also be executed using wireless links (e.g., a wireless backhaul, which may include Wi-Fi or WiGig links through one or multiple hops). An Ethernet TSN interface may be replaced by a wireless interface (e.g., and 802.11 MAC and/or physical layer PHY). An operation of a second wireless interface may also be managed by AP 102 to avoid interference with an interface used for communication with time sensitive user STAs (e.g., user devices 126, 128, and 130).

In some embodiments, AP 102 may perform admission control and scheduling tasks. To complete an association procedure for an STA with time sensitive data streams (e.g., user device 130), the STA may request admission from AP 102. AP 102 may define which APs may be in a WTSN domain and may determine the admission of new time sensitive data streams based on, for example, available resources and user requirements. AP 102 may create and/or update a transmission schedule that may include time sensitive operations and/or non-time sensitive operations, and the schedule may be provided to admitted user devices. AP 102 may be responsible for executing the schedule according to time sensitive protocols defined, for example, at 802.11 MAC/PHY layers.

In some embodiments, AP 102 may perform transmission schedule updates. AP 102 may update a transmission schedule for time sensitive data and may send transmission schedule updates to STAs and/or other APs during network operation. A transmission schedule update may be triggered by changes in wireless channel conditions at different APs and/or STAs within a common WTSN domain. The condition changes may include increased interference, new user traffic requests, and other network and/or operational changes that may affect a WTSN domain.

In some embodiments, AP 102 may collect measurement data from other devices in a WTSN domain. The measurement data may be collected from time sensitive and/or non-time sensitive devices. AP 102 may maintain detailed network statistics, for example, related to latency, packet error rates, retransmissions, channel access delay, etc. The network statistics may be collected via measurement reports sent from STAs. AP 102 may use network statistics to proactively manage wireless channel usage to allow for a target latency requirement to be satisfied. For example, measurements may be used to determine potential channel congestion and to trigger a change from a joint transmission schedule mode to a mode in which APs may allocate a same slot to multiple non-interfering STAs that may be leveraging spatial reuse capabilities.

It is understood that the above descriptions are for purposes of illustration and are not meant to be limiting.

Figure 1B:
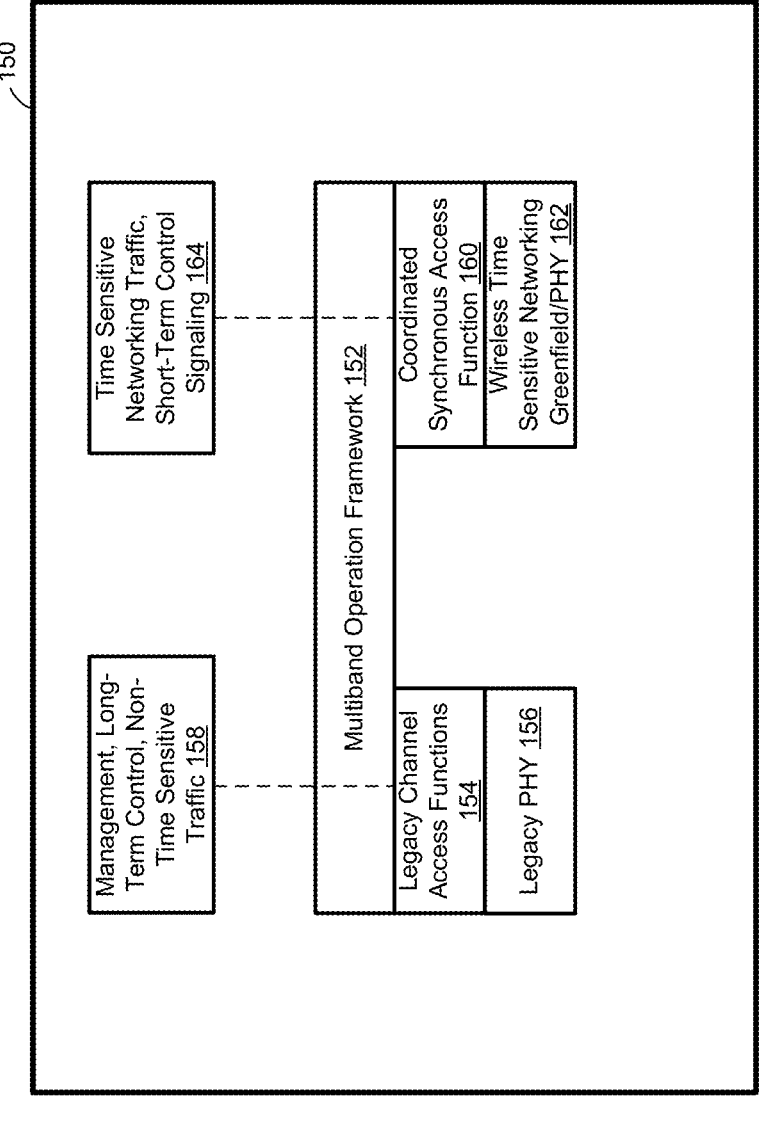
FIG. 1B illustrates an enhanced wireless time sensitive networking (WTSN) medium access control/physical layer (MAC/PHY) configuration for a WTSN device, in accordance with some embodiments.

FIG. 1B illustrates an enhanced WTSN MAC/PHY configuration for a WTSN device 150, in accordance with some embodiments.

In some embodiments, the WTSN device 150 may include a multiband operation framework 152, legacy channel access functions 154, legacy PHY 156, management, long-term control, and non-time sensitive traffic 158, coordinated synchronous access function (CSAF) 160, WTSN greenfield/PHY 162, and TSN traffic, short-term control signaling 164.

In some embodiments, the multiband operation framework 152 may allow WTSN device 150 to perform multiband operations. For example, some operations may be performed in one frequency band, while other operations may be performed in another frequency band. One frequency band may include a control channel, and another frequency band may include separate data channels.

In some embodiments, to provide for both WTSN and non-TSN operations, the WTSN device 150 may include a link for management, long-term control, and non-time sensitive traffic 158, and a link for TSN traffic and short-term control signaling 164. To support the management, long-term control, and non-time sensitive traffic 158, WTSN device 150 may include legacy channel access functions 154. Legacy channel access functions 154 may include a distributed coordination function (DCF), hybrid coordination function controlled channel access (HCF), and other channel access functions. The management, long-term control, and non-time sensitive traffic 158 may also be supported by a legacy PHY 156 (e.g., on a 2.4 GHz or 5 GHz frequency). Long-term control may include beacon transmissions, network association, security procedures, and other control traffic. Short-term control may include radio synchronization (e.g., time-frequency synchronization), scheduling, channel feedback, and other control traffic.

In some embodiments, to support the TSN traffic, short-term control signaling 164, WTSN device 150 include the CSAF 160 and the WTSN greenfield/PHY 162. The CSAF 160 may use a central coordinator at WTSN device 150 (e.g., AP 102 of FIG. 1A) to maintain a MAC/PHY level synchronization between the WTSN device 150 and non-AP STAs during an S-TXOP. The WTSN device 150 may control access to wireless media in a scheduled fashion in time, frequency, and spatial dimensions. With an infrastructure for a basic service set (BSS) for WTSN, during an S-TXOP, all WTSN STAs may need to adhere to the MAC/PHY synchronization at all times.

In some embodiments, when WTSN STAs (e.g., user device 126, user device 128, user device 130 of FIG. 1A) are not standalone devices, WTSN-capable devices may associate with a network using a legacy link (e.g., legacy channel access functions 154, legacy PHY 156, and management, long-term control, non-time sensitive traffic 158 of FIG. 1B). During association, a WTSN STA may indicate its capability and interest to join a WTSN operation mode. Through the legacy link, a multiband AP (e.g., AP 102 of FIG. 1A) may instruct the WTSN-capable STA to configure the WTSN STA's MAC/PHY on designated band. The WTSN MAC in the WTSN STA may achieve MAC/PHY synchronization and successfully read initial control and synchronization information in a synchronization and configuration frame (SCF) received from the AP in a WTSN band. Through the legacy link, the AP and STA may complete the association process by exchanging management frames. This process may be referred to as associating or establishing a channel/connection with a device.

In some embodiments, some long-term parameters and control signals related to a WTSN MAC/PHY operation may be conveyed from a WTSN AP to WTSN non-AP STAs through the legacy link.

In some embodiments, the legacy link may also be used for admission control and/or inter-BSS coordination, and the multiband operation framework 152 may be used to direct TSN traffic (e.g., TSN traffic, short-term control signaling 164) to the WTSN MAC/PHY (e.g., WTSN Greenfield/PHY 162). The WTSN MAC/PHY may provide functionality to support ultra-low and near-deterministic packet latency (e.g., one millisecond or less) with virtually no jitter in a controlled environment. Latency may be measured from a time when a logical link control (LLC) MAC service data unit (MDSU) enters a MAC sublayer at a transmitter to a time when the MDSU is successfully delivered from the MAC sublayer to an LLC sublayer on a receiver.

In some embodiments, WTSN operations may be facilitated by a synchronous and coordinated MAC/PHY operation during an S-TXOP between a WTSN AP and one or more non-AP WTSN STAs in a BSS infrastructure.

It is understood that the above descriptions are for purposes of illustration and are not meant to be limiting.

Figure 2:
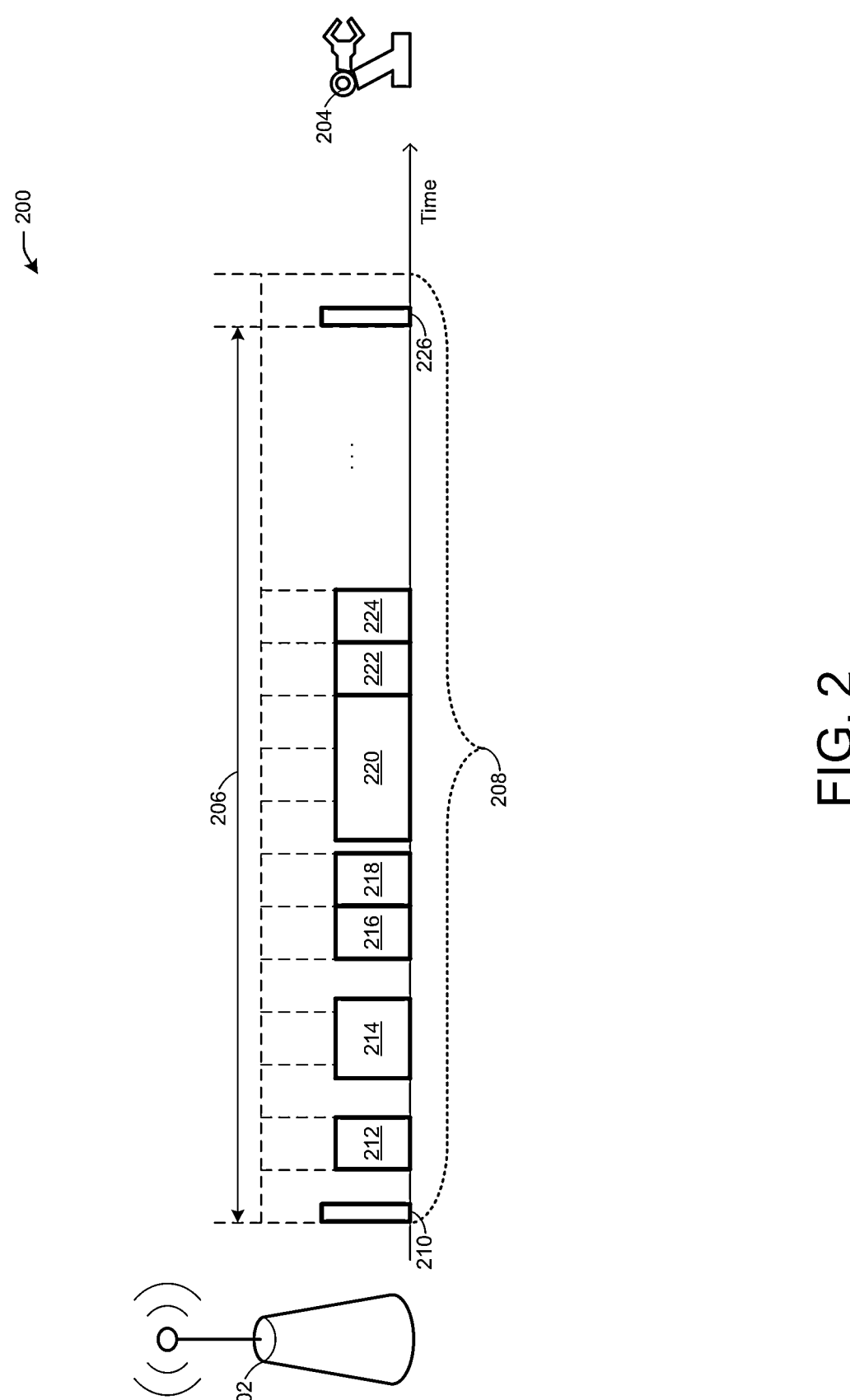
FIG. 2 illustrates a timing diagram of an enhanced WTSN time synchronization, in accordance with some embodiments.

FIG. 2 illustrates an timing diagram 200 of an enhanced WTSN time synchronization, in accordance with some embodiments. Referring to FIG. 2, there is shown uplink and downlink data frame flows between AP 202 and a TSN device 204. For example, TSN device 204 may receive downlink data frames from AP 202 and may send uplink data frames to AP 202. In one embodiment, the WTSN time synchronization may be utilized for persistent scheduling for synchronous transmission from TSN device 204 to AP 202.

In some embodiments, during a beacon period 206 (e.g., 100× cycle time), AP 202 may transmit or receive during one or more service periods 208 that comprise the beacon period 206. For example, service periods 208 may span 1 millisecond or some other time during which one or more transmissions may be made. A cycle time is a parameter that may be configured based on a service and/or latency requirements of one or more applications. For example, an STA application may generate packets in a synchronous/periodic pattern (e.g., of 1 millisecond cycles), and packets generated at the beginning of a cycle may need to be delivered within the cycle.

In some embodiments, AP 202 may send a control frame, such as a beacon 210 during a service period 208 at the beginning of beacon period 206. During TXOP 212, TXOP 214, TXOP 216, TXOP 218, TXOP 220, TXOP 220, TXOP 222, and TXOP 224, AP 202 may send or receive frames to/from TSN device 204. At the conclusion of beacon period 206, a new beacon period may begin with AP 202 sending beacon 226. In some embodiments, the control frame may be a trigger frame. In these embodiments, the control frame may be used to initiate a sequence of multiple transmissions within a period that repeats, as further described herein.

In some embodiments, any of TXOP 212, TXOP 214, TXOP 216, TXOP 218, TXOP 220, TXOP 220, TXOP 222, and TXOP 224 may include restricted or unrestricted service periods, time sensitive service periods, or non-time sensitive service periods. TXOP 212, TXOP 214, TXOP 216, TXOP 218, TXOP 220, TXOP 220, TXOP 222, and TXOP 224 may comprise one or more service periods 208.

It is understood that the above descriptions are for purposes of illustration and are not meant to be limiting.

Figure 3A:
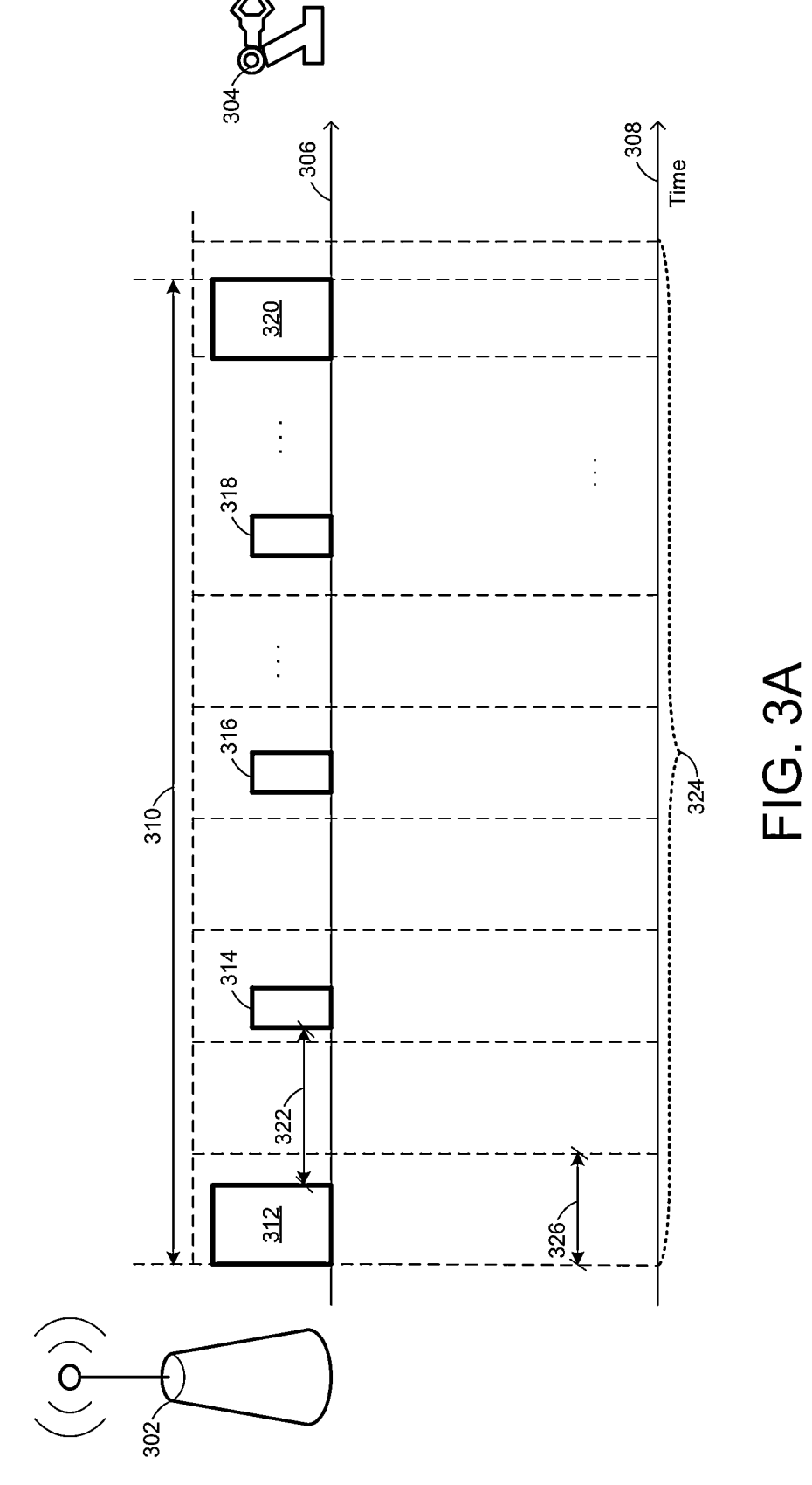
FIG. 3A illustrates a control channel access sequence, in accordance with some embodiments.

FIG. 3A illustrates an control channel access sequence 300, in accordance with some embodiments. In some embodiments, AP 302 may be a WTSN device (e.g., WTSN device 150 of FIG. 1B) in communication with STA 304, which may be another WTSN device. AP 302 and STA 304 may use a TSCCH 306 and a TSDCH 308 to transmit both control/management frames and data frames.

In some embodiments, a beacon period 310 (e.g., 100× cycle time) may begin with AP 302 sending beacon 312. Later in beacon period 310, AP 302 may send short beacon 314, short beacon 316, short beacon 318, or any number of short beacons supported by the beacon period 310. At the end of beacon period 310, another beacon 320 may be sent by AP 302. Beacon 312, short beacon 314, short beacon 316, short beacon 318, and/or beacon 320 may provide control/management frames to STA 304 in TSCCH 306.

In some embodiments, TSCCH 306 and TSDCH 308 may be divided into cycles 324 which may span a cycle time 326 (e.g., 1 ms). Beacon 312, short beacon 314, short beacon 316, short beacon 318, and/or beacon 320 may not require an entire cycle 324.

In some embodiments, TSCCH 306 and TSDCH 308 may be logical channels defined within an existing or new physical channel/frequency band. TSCCH 306 may be defined within a primary channel, while TSDCH 308 may be defined in a secondary or dedicated TS channel, possibly in another frequency band. TSCCH 306 may be used for time sensitive access under control of AP 302. TSDCH 308 may be defined in an existing or new band (e.g., 6-7 GHz).

In some embodiments, configurations for TSCCH 306 and/or TSDCH 308 may be transmitted as information elements in beacon 312, short beacon 314, short beacon 316, short beacon 318, and/or beacon 320. The configurations may provide information identifying the corresponding physical channels used for TSCCH 306 and TSDCH 308.

In some embodiments, TSCCH 306 may be defined as periodic resources (e.g., time-frequency slots) for exchanging control frames. Defining a periodic interval for control frames may be important to enable time sensitive STAs (e.g., STA 304) to schedule time sensitive data and control actions without conflicts (e.g., conflicts with other devices).

In some embodiments, TSCCH 306 may be used to transmit regular beacons (e.g., beacon 312, beacon 320) and short beacons (e.g., short beacon 314, short beacon 316, short beacon 318), which may include a subset of information transmitted of regular beacons (e.g., an updated transmission schedule or bitmap of restricted time sensitive service periods). Short beacon transmissions may be scheduled in predefined intervals (e.g., fractions of beacon period 310). Other management frames may also be transmitted in TSCCH 306, such as association request/response frames, timing measurements, and channel feedback measurement frames.

In some embodiments, access to TSCCH 306 may use contention-based TSN sequence 300. Contention-based TSN sequence 300 may follow a legacy carrier-sense multiple access (CSMA)-based IEEE 802.11 MAC protocol. For example, when TSCCH 306 is defined as the operating/primary channel, AP 302 may contend for TSCCH 306 using enhanced distributed channel access (EDCA) to transmit beacon (e.g., beacon 312, beacon 320) and short beacons (e.g., short beacon 314, short beacon 316, short beacon 318) at predefined intervals. TSCCH control frames (e.g., beacon 312, short beacon 314, short beacon 316, short beacon 318, and/or beacon 320) may include information to support a time synchronized scheduled access in TSDCH 308. Such operation may enable time sensitive operations for legacy Wi-Fi systems in which TSCCH 306 may provide an anchor for TSDCH 308 (e.g., time synchronized and schedule) in one or more restricted channels and/or frequency bands.

In some embodiments, access to TSCCH 306 may use a time-synchronized access method. TSCCH 306 may be defined as periodic scheduled resources (e.g., time slots) for regular beacons (e.g., beacon 312, beacon 320) and short beacons (e.g., short beacon 314, short beacon 316, short beacon 318) using time-synchronized access. Access to time slots (e.g., cycles 324) may still be based on contention (e.g., CSMA) or may be scheduled. For example, slots may be reserved for beacons and short beacons, which may be transmitted periodically (e.g., every fifth slot). TSCCH 306 may also be aligned with TSDCH 308 timing. TSCCH time slots reserved for beacons and/or short beacons may be announced in regular beacons so that newly admitted STAs (e.g., STA 304) may discover TSCCH 306 parameters. All STAs may be required to adhere to time synchronization across channels and ensure TXOPs do not overlap with scheduled TSCCH slots. In addition, all STAs may be required to listen to TSCCH 306 during scheduled beacon/ short beacon slots to make sure the STAs receive those beacons/short beacons. Such operation may provide a more deterministic operation as timing of each TSCCH 306 may be controlled and collisions may be avoided through efficient scheduling.

In some embodiments, remaining time of TSCCH slots (e.g., cycles 324) occupied by a beacon/short beacon may be used to exchange other control/management frames. In some embodiments, AP 302 may transmit unicast control/management frames to STA 304 using TSDCH 308 provided that the control/management frames do not interfere with time sensitive data.

It is understood that the aforementioned example is for purposes of illustration and not meant to be limiting.

Figure 3B:
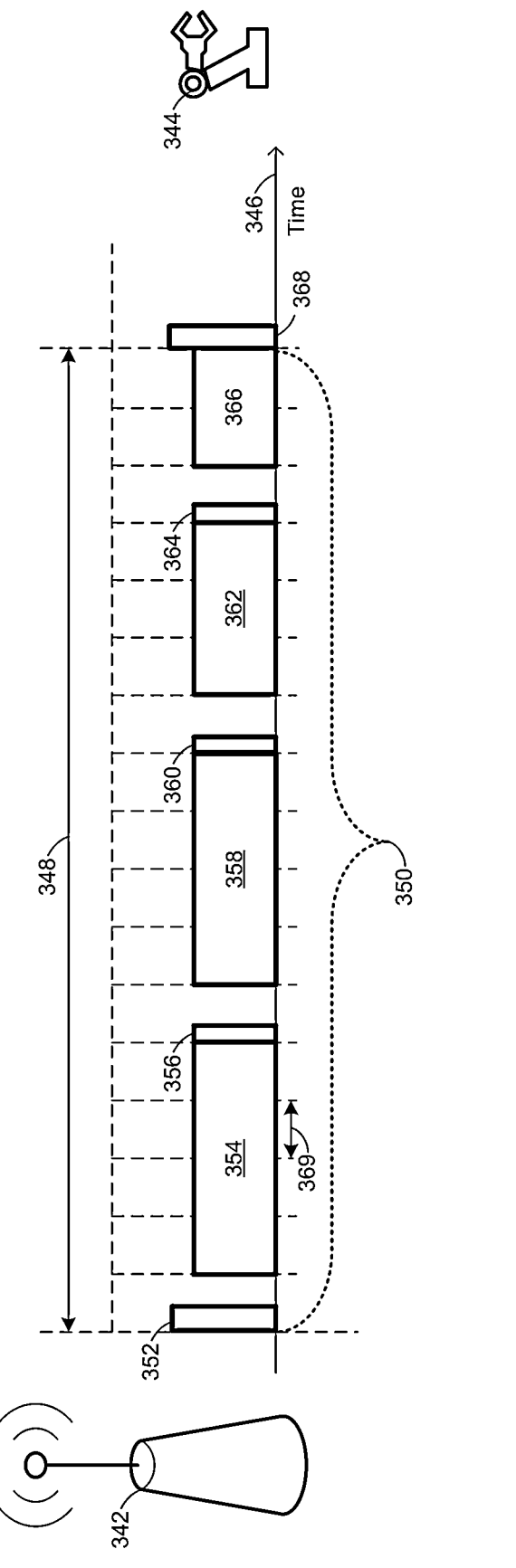
FIG. 3B illustrates a combined channel access sequence, in accordance with some embodiments.

FIG. 3B illustrates an combined channel access sequence 340, in accordance with some embodiments. In some embodiments, AP 342 may be a WTSN device (e.g., WTSN device 150 of FIG. 1B) in communication with STA 344, which may be another WTSN device. AP 342 and STA 344 may use channel 346 to transmit both control/management frames and data frames.

In some embodiments, a beacon period 348 (e.g., 100× cycle time) having one or more cycles 350 may begin with AP 342 sending beacon 352. Later in beacon period 348, AP 342 and/or STA 344 may send one or more data frames 354. AP 342 may send short beacon 356. AP 342 and/or STA 344 may send one or more data frames 358. AP 342 may send short beacon 360. AP 342 and/or STA 344 may send one or more data frames 362. AP 342 may send short beacon 364. AP 342 and/or STA 344 may send one or more data frames 366. After beacon period 348 has concluded, AP 342 may send another beacon 368 to begin another beacon period. The beacons (e.g., beacon 352, short beacon 356, short beacon 360, short beacon 364, and beacon 368) may be sent in channel 346. The one or more data frames (e.g., one or more data frames 354, one or more data frames 358, one or more data frames 362, and one or more data frames 366) may be sent in the channel 346.

In some embodiments, channel 346 may be divided into cycles 350 which may span a cycle time 369 (e.g., 1 ms). Beacon 352, short beacon 356, short beacon 360, short beacon 364, and beacon 368 may not require an entire cycle 350. The one or more data frames (e.g., one or more data frames 354, one or more data frames 358, one or more data frames 362, and one or more data frames 366) may use one or more cycles 350 and may use partial cycles 350.

In some embodiments, channel 346 may be a physical channel that includes a TSCCH and TSDCH. Using cycles 350, control/management frames (e.g., beacon 352, short beacon 356, short beacon 360, short beacon 364, and beacon 368) and data frames (e.g., one or more data frames 354, one or more data frames 358, one or more data frames 362, and one or more data frames 366) may be scheduled to avoid overlapping/conflicting transmissions. Such enhanced coordination may facilitate WTSN communications which meet the latency and reliability requirements of WTSN operations.

It is understood that the aforementioned example is for purposes of illustration and not meant to be limiting.

Figure 3C:
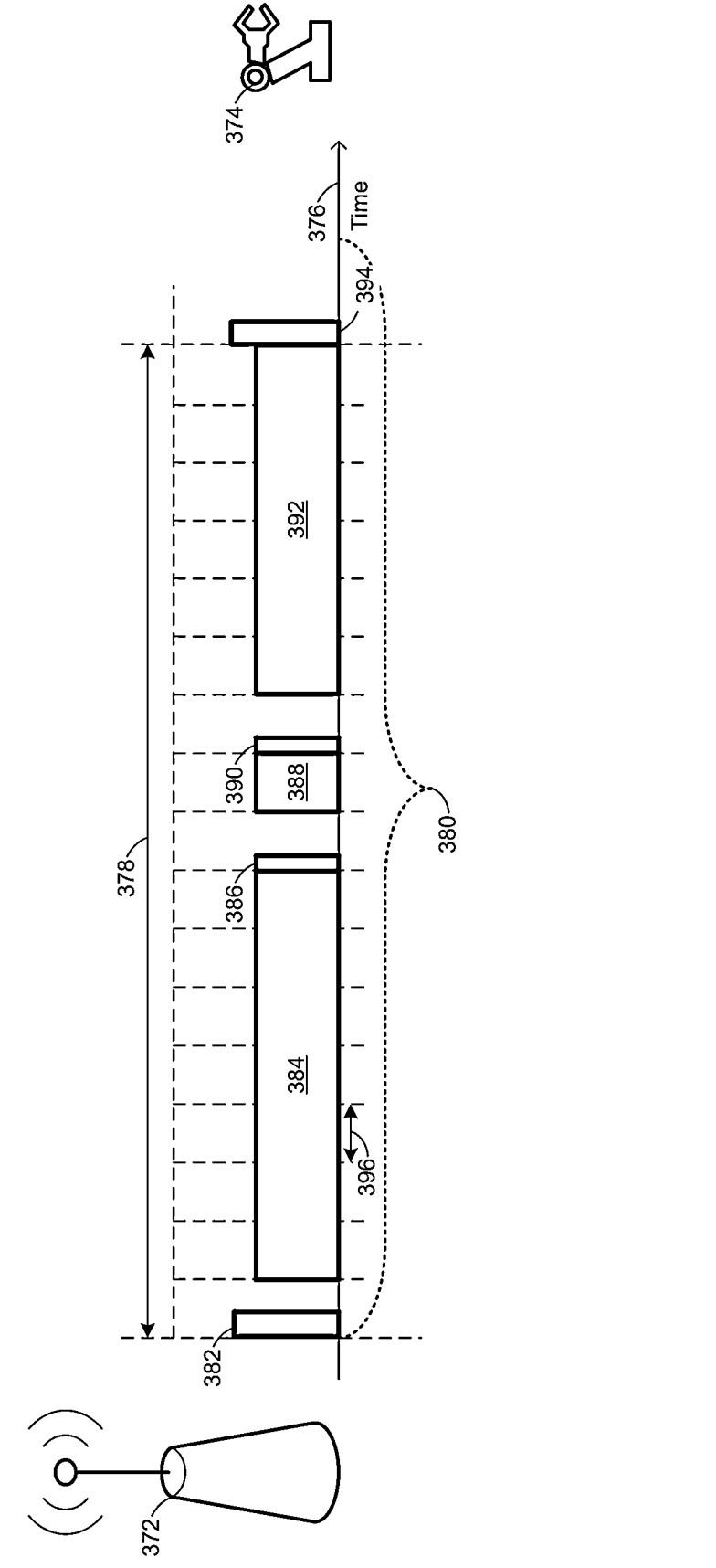
FIG. 3C illustrates an on-demand channel access sequence, in accordance with some embodiments.

FIG. 3C illustrates an on-demand channel access sequence 370, in accordance with some embodiments. In some embodiments, AP 372 may be a WTSN device (e.g., WTSN device 150 of FIG. 1B) in communication with STA 374, which may be another WTSN device. AP 372 and STA 374 may use channel 376 to transmit both control/management frames and data frames.

In some embodiments, a beacon period 378 (e.g., 100× cycle time) having one or more cycles 380 may begin with AP 372 sending beacon 382. Later in beacon period 378, AP 372 and/or STA 374 may send one or more data frames 384. AP 372 may send short beacon 386. AP 372 and/or STA 374 may send one or more data frames 388. AP 372 may send short beacon 390. AP 372 and/or STA 374 may send one or more data frames 392. After beacon period 378 has concluded, AP 372 may send another beacon 394 to begin another beacon period. The beacons (e.g., beacon 382, short beacon 386, short beacon 390, and beacon 394) may be sent in channel 376. The one or more data frames (e.g., one or more data frames 384, one or more data frames 388, and one or more data frames 392) may be sent in the channel 376.

In some embodiments, AP 372 may send control/management frames (e.g., beacon 382, short beacon 386, short beacon 390, and beacon 394) on demand using resources such as time slots (e.g., cycles 380) that may not be reserved for time sensitive data.

Figures 4A, 4B:
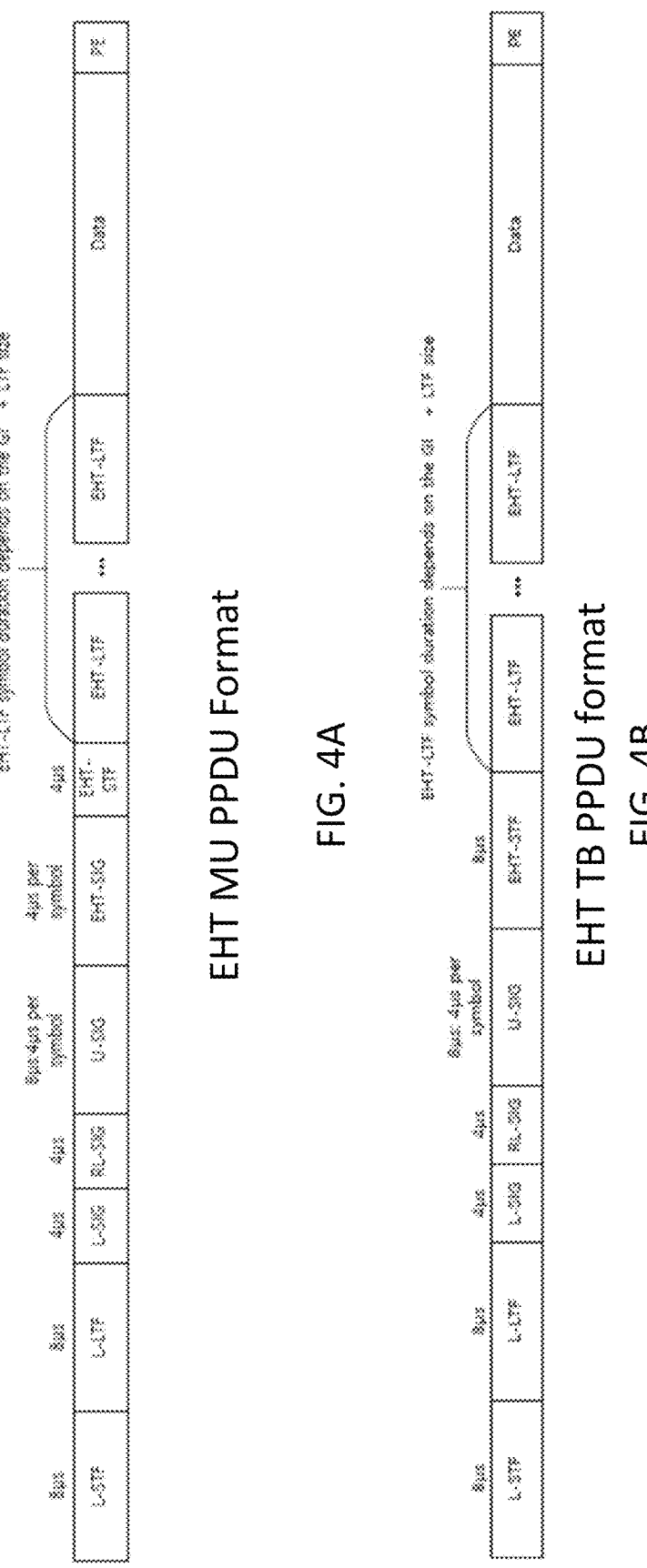
FIG. 4A illustrates an EHT MU PPDU format, in accordance with some embodiments.
FIG. 4B illustrates an EHT TB PPDU format, in accordance with some embodiments.

FIG. 4A illustrates an EHT MU PPDU format, in accordance with some embodiments. The EHT MU PPDU format used for transmission to one or more users. The PPDU is not a response to a triggering frame. In the EHT MU PPDU, the EHT-SIG field is present.

FIG. 4B illustrates an EHT TB PPDU format, in accordance with some embodiments. The EHT TB PPDU format is used for a transmission that is a response to a triggering frame from an AP. In the EHT TB PPDU, the EHT-SIG field is not present and the duration of the EHT-STF field is twice the duration of the EHT-STF field in the EHT MU PPDU.

To increase the overall throughput of Wi-Fi devices, transmit opportunity (TXOP) and frame aggregation was introduced in 802.11n and subsequent standards. This aggregation makes PPDU data payload much bigger and therefore occupies a much longer airtime.

Although frame aggregation helps improve throughput and reduce average latency for a pair of STAs, it can result in a much higher worst-case latency for a 3rd party STA waiting for the wireless medium to be idle due to a much longer airtime occupied by a long aggregated PPDU between the pair of STAs. Time-sensitive frames may experience a higher latency if the channel is occupied by a long PPDU transmission by other devices from the same BSS or overlapping BSS (OBSS).

Figure 5:
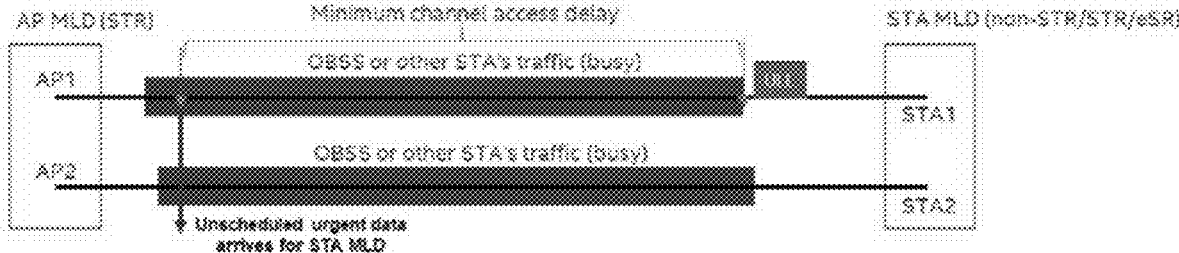
FIG. 5 illustrates channel access delay associated with simultaneous transmission and reception (STR) operations, in accordance with some embodiments.

With the introduction of multiple link capability in 802.11be, this problem can be mitigated if a client device supports simultaneous transmission and reception (STR) and if there is at least one link idle. However, this problem still exists if both two channels are occupied by any ongoing transmission from the same or overlapping BSS (OBSS) as shown in FIG. 5. FIG. 5 illustrates channel access delay associated with simultaneous transmission and reception (STR) operations, in accordance with some embodiments.

In some embodiments, a physical layer protocol data unit may be a physical layer conformance procedure (PLCP) protocol data unit (PPDU). In some embodiments, the AP and STAs may communicate in accordance with one of the IEEE 802.11 standards. IEEE 802.11-2016 is incorporated herein by reference. IEEE P802.11-REVmd/D2.4, August 2019, and IEEE draft specification IEEE P802.11ax/D5.0, October 2019 are incorporated herein by reference in their entireties. In some embodiments, the AP and STAs may be directional multi-gigabit (DMG) STAs or enhanced DMG (EDMG) STAs configured to communicate in accordance with IEEE 802.11ad standard or IEEE draft specification IEEE P802.11ay, February 2019, which is incorporated herein by reference.

Figure 6:
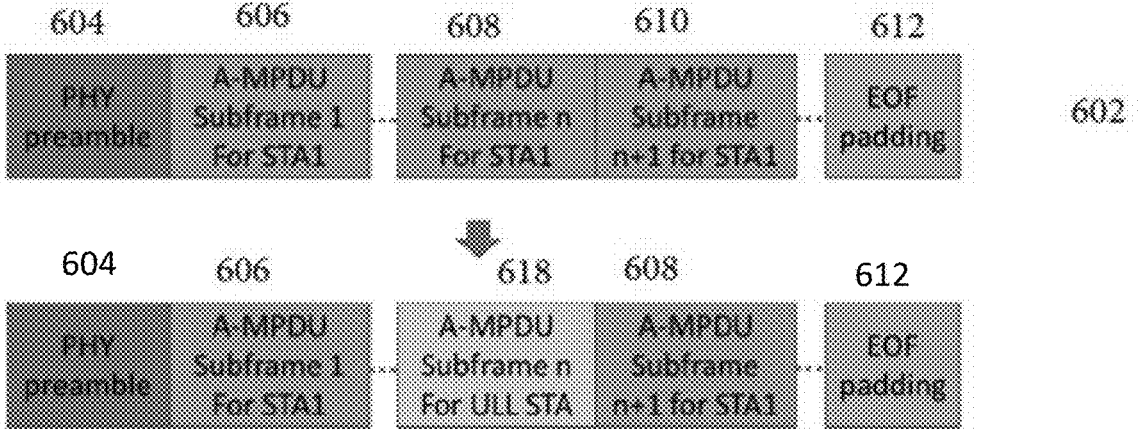
FIG. 6 illustrates aggregated MAC Protocol Data Unit (A-MPDU) preemption for time-critical ultra-low latency (ULL) communications, in accordance with some embodiments.

FIG. 6 illustrates A-MPDU preemption for time-critical ultra-low latency (ULL) communications, in accordance with some embodiments. Some embodiments are directed to an access point station (AP) configured for communicating time-critical ultra-low latency (ULL) data. In these embodiments, the AP may be configured to encode a physical layer protocol data unit (PPDU) 602 (see FIG. 6) for transmission to a first associated non-AP station (STA1). The PPDU may comprising a physical layer (PHY) preamble 604 followed by a sequence of aggregated MAC Protocol Data Unit (A-MPDU) subframes 606, 608, 610, etc., followed by end-of-file (EOF) padding 612. The AP may initiate transmission of the PPDU. In these embodiments, when time-critical ultra-low latency (ULL) data for a second associated STA (STA2) becomes available at a medium access control (MAC) layer from an upper layer of the AP during transmission of the PPDU, the AP may be configured to encode the time-critical ULL data in a new A-MPDU subframe 618 and insert the new A-MPDU subframe 618 before one of the A-MPDU subframes of the PPDUs that has not yet been transmitted (i.e., before A-MPDU subframe 608). In these embodiments, the AP may complete transmission of the PPDU 602 with the new A-MPDU subframe 618 followed by all but one of the remaining A-MPDU subframes for the STA1.

In these embodiments, when time-critical ULL data for another STA (i.e., STA2) becomes available after transmission of a PPDU is initiated, an A-MPDU subframe of the PPDU may be preempted or delayed (i.e., A-MPDU subframe 608) with an A-MPDU subframe that includes the time-critical ULL data. In these embodiments, new A-MPDU subframe 618 with the time-critical ULL data is included before A-MPDU subframe 608. In these embodiments, the last A-MPDU subframe of the PPDU for the STA1 may not be able to be transmitted since the PPDU is not changed. As illustrated in FIG. 6, A-MPDU subframe n 618 is now encoded for time-critical ULL data and is intended for STA2.

In some embodiments, the new A-MPDU subframe 618 may be encoded to include zero-padding to set a size of the new A-MPDU subframe 618 equal to a size of the A-MPDU subframe 608 that has been preempted. In these embodiments, the size of the new A-MPDU subframe 618 may be kept equal to the size of the preempted A-MPDU subframes 608. When the time-critical ULL data is smaller/less than the data in the preempted A-MPDU subframe 608, zero padding is used to make the sizes equal.

In some embodiments, the AP may also be configured to encode the EHT-SIG of the PHY preamble 604 to include association identifier (AID) of only the STA1, encode the A-MPDU subframes 606 for the STA1 to include a MAC address of the STA1, and encode the new A-MPDU subframe 608 for the STA2 to include a MAC address of the STA2. In these embodiments, the PPDU may be encoded as single user PPDU (SU PPDU) (i.e., the single user being STA1)). In these embodiments, the time-critical ULL STA (i.e., STA2) may have been previously instructed by the AP to decode PPDUs for STA1 to look for time-critical ULL data. In these embodiments, the time-critical ULL STA (STA2) may be bonded with STA1 for reception of time-critical ULL data, although the scope of the embodiments is not limited in this respect.

In some embodiments, the AP may be further configured to encode the A-MPDU subframes 606, 608, 610 for the STA1 and indicate ACK if desired (i.e., the acknowledgement field for these subframes may be set to ACK or NACK). The AP may also encode the new A-MPDU subframe 618 for the STA2 and indicate NACK for the new A-MPDU subframe 618. In these embodiments, the ACK policy for each A-MPDU subframe may individually set.

In some embodiments, the AP may further be configured to encode the new A-MPDU subframe using one or more physical layer (PHY) parameters (e.g., an MCS indicated in a signal field (SIG) e.g., one of the HE-SIG-A field and SIG field of the PHY preamble of the PPDU. In these embodiments, a PHY layer change is avoided since at least some of the physical layer parameters are unchanged.

In some embodiments, the PPDU may be encoded as a single user (SU) PPDU for the STA1, although the scope of the embodiments is not limited in this respect. In some embodiments, the PPDU may be a MU PPDU.

In some embodiments, prior to initiating transmission of the PPDU to the STA1, the AP and the STA2 have established a time-sensitive networking application that includes communication of the time-critical ULL data therebetween. In some embodiments, as part of establishment of the time-sensitive networking application, the AP may have indicated to the STA2 to decode PPDUs for STA1 for possible transmission of the time-critical ULL data for STA2 (e.g., STA1 and ST2 are bonded). In these embodiments, prior to initiating transmission of the PPDU to the STA1, the AP may acquire a TXOP for transmission of the PPDU. In these embodiments, STA1 may be a bonded STA. In these embodiments, particularly in the case of a-periodic ULL data, the STA2 (the time-critical ULL STA) may need to decode each A-MPDU subframe of the PPDU with the AID of the bonded STA in the preamble (such as STA1's AID in the EHT-SIG) to determine if the A-MPDU subframe has a MAC address of STA2. When the subframe has the MAC address of STA2, STA2 may further decode the A-MPDU subframe to extract the time-critical ULL data. In the case of periodic time-critical ULL data, the STA2 may know apriori which A-MPDU subframe of the PPDU includes the time-critical ULL data and therefore it may not need to decode each A-MPDU subframe of the PPDU to determine which A-MPDU subframe is intended for the STA2.

In some embodiments, the time-critical ULL data for the STA2 may be received at the MAC layer from an application upper layer of the AP. In these embodiments the AP may initiate transmission of the PPDU to the STA1 when there is no time-critical ULL data available for the STA2 in a transmission queue. In these embodiments, when the time-critical ULL data for the STA2 is received at the MAC layer from the application upper layer of the AP after transmission of the PPDU has been initiated, the AP may delay one of the A-MPDU subframes for the STA1 and insert the new A-MPDU subframe in the PPDU that includes that the time-critical ULL data for the STA2.

In some embodiments, the time-critical ULL data has a latency requirement of less than or equal to one millisecond (ms), although the scope of the embodiments is not limited in this respect.

In some embodiments, the AP may insert the new A-MPDU subframe 618 into the PPDU when transmission of the time-critical ULL data after transmission the PPDU without the time-critical ULL data would exceed the latency requirement (i.e., to meet the latency requirement, the time-critical ULL data needs to be transmitted within the PPDU that is currently being transmitted). In these embodiments, the AP may refrain from inserting the new A-MPDU sub-frame 618 when transmission of the time-critical ULL data after transmission the PPDU would not exceed the latency requirement (i.e., the latency requirement can be met by transmission of the time-critical ULL data subsequent to transmission of the PPDU. In some embodiments, the latency requirement for time-critical ULL data is less than or equal to one millisecond (1 ms) with a size limit of 100 bytes, although the scope of the embodiments is not limited in this respect.

In some embodiments, after transmission of the PPDU is initiated and when the time-critical ULL data for the STA2 does not becomes available during transmission of the PPDU, the processing circuitry is configured to refrain from encoding the time-critical ULL data in the new A-MPDU subframe. The AP may also refrain from inserting the new A-MPDU subframe into the PPDU and complete transmission of the PPDU 602 with the A-MPDU subframes without the new A-MPDU subframe.

Some embodiments are directed to a non-transitory computer-readable storage medium that stores instructions for execution by processing circuitry of an access point station (AP). In these embodiments, the processing circuitry may be configured to encode a physical layer protocol data unit (PPDU) 602 for transmission to a first associated non-AP station (STA1). The PPDU comprising a physical layer (PHY) preamble 604 followed by a sequence of aggregated MAC Protocol Data Unit (A-MPDU subframe) subframes 606, 608, 610 followed by end-of-file (EOF) padding 612. The processing circuitry may configure the AP to initiate transmission of the PPDU. When time-critical ultra-low latency (ULL) data for a second associated STA (STA2) becomes available at a medium access control (MAC) layer from an upper layer of the AP during transmission of the PPDU, the processing circuitry may encode the time-critical ULL data in a new A-MPDU subframe 618 and may insert the new A-MPDU subframe 618 before one of the A-MPDU subframes of the PPDU that has not yet been transmitted (i.e., before A-MPDU subframe 608). The processing circuitry may configure the AP to complete transmission of the PPDU 602 with the new A-MPDU subframe 618 followed by all but one of the remaining A-MPDU subframes for the STA1. In some embodiments, the memory may be configured to store time-critical ULL data. In some embodiments, the processing circuitry may comprise a baseband processor.

Some embodiments are directed to a non-AP station (STA) (STA2). In these embodiments, for receiving time-critical ultra-low latency (ULL) data from an access point station (AP), the STA2 may decode a physical layer protocol data unit (PPDU) 602 for a first associated non-AP station (STA1) (i.e., another STA). The PPDU may comprise a PHY preamble 604 followed by a sequence of aggregated MAC Protocol Data Unit (A-MPDU subframe) subframes. In these embodiments, the STA2 may decode the A-MPDU subframes to determine if any one of the A-MPDU subframes have a MAC address of the STA2. In these embodiments, the time-critical ULL data may be encoded in the one A-MPDU subframe that has the MAC address of the STA2.

In some embodiments, for the one of the A-MPDU subframes have the MAC address of the STA2, the STA2 may be configured to further decode the A-MPDU subframe and provide the time-critical ULL data to an application layer of the STA2.

In some embodiments, the STA2 may be further configured to establish, with the AP, a time-sensitive networking application that includes communication of the time-critical ULL data therebetween. In these embodiments, as part of the establishment of the time-sensitive networking application, the AP may be indicated to the STA2 that PPDUs for STA1 may include A-MPDU subframes with a MAC address of the STA2 indicating the time-critical ULL data for STA2.

The following patent applications are incorporated by reference: PCT/US2017/067134, Filed Dec. 18, 2017, Published Jun. 27, 2019 as WO2019/125396, and entitled "ENHANCED TIME SENSITIVE NETWORKING FOR WIRELESS COMMUNICATIONS" [Ref No. AA5687-PCT]; PCT/US2018/035868, Filed Jun. 4, 2018, Published Dec. 12, 2019 as WO2019/236052, entitled "METHODS AND APPARATUS TO FACILITATE A SYNCHRONOUS TRANSMISSION OPPORTUNITY IN A WIRELESS LOCAL AREA NETWORK" [Ref No. AA8799-PCT]; U.S. Ser. No. 16/870,156, Filed May 8, 2020, Published as US2020-0267636 A1, entitled "EXTREME HIGH THROUGHPUT (EHT) TIME-SENSITIVE NETWORKING" [Ref No. AC2096-US]

As discussed above, embodiments disclosed herein are directed to communicating time-critical ultra-low latency (ULL) data. In some embodiments, an access point station (AP) communicates time-critical ULL data using aggregated MAC Protocol Data Unit (A-MPDU) preemption. These embodiments disclosed herein provide a method that allows the AP to transmit data to other STAs to for time critical ULL data when there no time-critical packet ready to be transmitted. The embodiments provide for improved spectrum efficiency since dedicated resources are not used. Some embodiments provide low latency performance for ultra-low latency application while minimizing the spectrum efficiency loss or the effect to the existing data transmission. In these embodiments, in the downlink case, with A-MPDU preemption, the AP is able to suspend the current data transmission to a STA to insert time critical packet transmission to the (Ultra-low latency) ULL STA in MPDU level. Embodiments disclosed herein may be applied to peer-to-peer scenarios. A STA inserts a packet for another STA while sending packets to the AP.

In these embodiments, assuming that within a BSS, there is time critical traffic to be transmitted to a STA referred here as Ultralow latency (ULL) STA. AP will indicate the capability of MPDU preemption for ultra-low latency packet transmission in the beacon frame or through association process with the STA. While the AP is sending down-link SU PPDU to a STA and there is short time critical packet for an ULL STA, the AP can defer one A-MPDU subframe and replace it with the short time critical packet. To minimize the change to the existing PPDU scheduling (i.e., duration of the A-MPDU), the size of the A-MPDU subframe may be kept the same by zero padding if the time critical packet is not long enough to fill the whole A-MPDU subframe.

On the other hand, to avoid the PHY layer change, same PHY layer parameter, which is defined in HE-SIG A or SIG field, such as the MCS level, will be used for the A-MPDU subframe to the ULL STA. Here we assume the ULL STA is at the transmission range that can support the MCS that is being used for the A-MPDU transmission. To reduce the power consumption of the ULL STA, the AP and ULL STA may engage in a pre-negotiation that whose downlink data the AP may preempt to transmit the ULL STA. As a result, the ULL STA can ignore the rest of the PPDU once it decoded that the PPDU is for the STA that is not the pre-negotiated STA. In these embodiments, a "NO ACK" or "delayed ACK" policy may be used for the ULL MPDU. For the non-ULL STA, (e.g., STA1 in FIG. 6), the acknowledgement of the ULL MPDU(s) not addressed to the non-ULL STA may be set to NACK. Similarly, for the ULL STA, the acknowledgement of the non-ULL MPDUs may be set to NACK. The ULL MPDU may have a different sequence number and the non-ULL STA does not need to send anything response to the ULL MPDU. In general, the new PPDU duration may need to be the same or less than the original since the PPDU duration is specified in the PHY preamble.

In some embodiments, a multi-user (MU) PPDU may be used to communication time-critical ULL data. While the AP is sending downlink MU PPDU to multiple STAs and there is a short time critical packet for an ULL STA. The AP can defer one A-MPDU over one resource unit (RU) and replace it with the short time critical packet.

To minimize the change to the existing PPDU scheduling, the size of the A-MPDU subframe may be kept the same by zero padding if the time critical packet is not long enough to fill the whole A-MPDU subframe. To avoid the PHY layer change, same PHY layer parameter, which is defined in HE-SIG B user specific field for HE MU PPDU case as shown Table 1, such as the MCS level, will be used for the In these embodiments, the AID may be used in the PHY preamble so that both the non-ULL device and the ULL device are notified to receive the PPDU. Since there is a MAC address in each MPDU, the devices can find their MPDU(s) by checking the MAC address. For the MPDU with other device's MAC address or a corrupted MPDU, a NACK should be used. Similar to SU PPDU case, "NO ACK" or "delayed ACK" policy may be used for the ULL MPDU.

In some embodiments, for acknowledgement for the non-ULL and ULL STA signaling may be used to adjust the RU allocation of the BA response of the ULL STA and the non-ULL STA. In some embodiments, the A-control field or TRS may be used to carry the allocation directly in the MPDU of the non-ULL STA for the non-ULL STA and in the MPDU of the ULL STA for the ULL STA. In embodiments that use the TRS, the rules may be changed so that the A-control can be different in all MPDUs within the A-MPDU. In some alternate embodiments, a trigger frame addressed to the ULL STA and a trigger frame addressed to the non-ULL STA may be used to provide two orthogonal allocations. Alternatively, a single trigger frame in broadcast address including allocation for non-ULL STA and the ULL STA may be used, although the scope of the embodiments are not limited in this respect.

TABLE 1

| | | | User Field Format for non-MU MIMO allocation |
|---|---|---|---|
| Bit | Subfield | Number of bits | Description |
| B0-B10 | STA-ID | 11 | Set to a value of the TXVECTOR parameter STA_ID (see 26.11.1 (STA_ID)). |
| B11-B13 | NSTS | 3 | If the STA-ID subfield is not 2046, indicates the number of space-time streams and is set to the number of space-time streams minus 1, Set to an arbitrary value if the STA-ID subfield is 2046. |
| B14 | Beamformed | 1 | If the STA-ID subfield is not 2046, used in transmit beamforming: Set to 1 if a beamforming steering matrix is applied to the waveform in a non-MU-MIMO allocation. Set at 0 otherwise. Set to an arbitrary value if the STA-ID subfield is 2046. |
| B15-B18 | HE-MCS | 4 | If the STA-ID subfield is not 2046, indicates the modulation and coding scheme: Set to n for HE-MCS n, where n = 0, 1, 2, . . . , 11 Values 12-15 are reserved. Set to an arbitrary value if the STA-ID subfield is 2046. |
| B19 | DCM | 1 | If the STA-ID subfield is not 2046, indicates whether DCM is used; Set to 1 to indicate that the payload of the corresponding user of the HE MU PPDU is modulated with DCM for the HE-MCS. Set to 0 to indicate that the payload of the corresponding user of the PPDU is not modulated with DCM for the HE-MCS. Set to an arbitrary value if the STA-ID subfield is 2046. |
| B20 | Coding | 1 | If the STA-ID subfield is not 2046, indicates whether BCC or LDPC is used: Set to 0 for BCC, Set to 1 for LDPC. Set to an arbitrary value if the STA-ID subfield is 2046 |

A-MPDU subframe to the ULL STA. The STA-ID sub field is set to a value indicated from TXVECTOR parameter STA_ID to identify the receiver of the data sent over this RU. If this RU is going to be used to insert time critical packet for ULL STA, this STA_ID should signal the AID of the scheduled STA as well as an indication that it is also going to be used for an ULL STA. These may be pre-negotiated and known to both the AP and the STAs. For reducing the power consumption, the number of receiving devices for the same PPDU or resource unit may be as small as possible. An STA_ID may be defined for a group of devices including the ULL STA and the non-ULL STA.

Alternatively, one RU may be assigned to more than one user which includes one or more ULL STAB in a non-MU-MIMO allocation by modifying the current 802.11 spec rules that only allows more than one user assigned to one RU in a MU-MIMO allocation. To indicate which RU(s) are used for multiple user multiplexing and the number of multiplexed users, embodiments disclosed herein add a new subfield (i.e., a MU multiplexing (MU-MUX) subfield) that may be nine (9) bits long (based on RU allocation definition in 11ax; the size can be revised based on the definition in Wi-Fi8) in the Common field of the HE-SIG-B. Table 2 illustrates an RU allocation Subfield. The location of this information could be changed for Wi-Fi8 when the preamble is redefined. The MU-MUX subfield may be encoded to indicate the number of users multiplexed in each RU that is smaller than 106-tone that is indicated in the RU Allocation subfield. For a 26-tone RU, 1 bit of the MU-MUX subfield indicates the number of users in the RU up to 2 users (i.e. set to 0 for 1 user and 1 for 2 users). For a 52-tone RU, 2 bits of the MU-MUX subfield indicates the number of users in the RU up to 4 users. For an RU that is smaller than 106-tone non-MU-MIMO allocation is used and for an RU with 106 or 242-tone, MU-MIMO allocation is used.

For example, when the RU Allocation subfield is 1 (00000001), the last RU is 52-tone and the rest are 26-tone. In the case, the first bit in the MU-MUX subfield corresponds to the number of users for the first 26-tone RU (e.g., if set to 1, then 2 users), and the second bit corresponds to the number of users in the second 26-tone RU, and so on and the last two bits (B7 and B8) corresponds to the number of users for the last 52-tone RU (e.g., when set to 3 then, 4 users multiplexed).

When the RU allocation includes a 106 or 242-tone RU or no user allocated RU, the MU-MUX subfield encoding skips those RU locations and only indicates the RUs that are 26 or 52 tones with at least one user (see table 2). For example, if the RU Allocation subfield is 00011001 (i.e., $y2y1y0=001$), the first 106-tone RU has 2 users using MU-MIMO allocation, and the 2nd RU has no user, and the number of users for the 3rd RU (52-tone) is indicated in the first two bits (B0 and B1) in the MU-MUX subfield and the number of users for the last RU (52-tone) is indicated in the B2 and B3 in the MU-MUX subfield.

TABLE 2

| RU Allocation Subfield | | | | | | | | | |
|---|---|---|---|---|---|---|---|---|---|
| RU Allocation subfield (B7 B6 B5 B4 B3 B2 B1 B0) | #1 | #2 | #3 | #4 | #5 | #6 | #7 | #8 | #9 |
| 0 (00000000) | 26 | 26 | 26 | 26 | 26 | 26 | 26 | 26 | 26 |
| 1 (00000001) | 26 | 26 | 26 | 26 | 26 | 26 | 26 | 52 | |
| 24-31 ($00011y_2y_1y_0$) | | | 106 | | — | 52 | | 52 | |

In this way, the ULL STA(s) can use the MCS or PHY parameters that are different than those of the other users in the A-MPDU in the same RU. The rest of the procedure that inserts an ULL packet in the middle of an A-MPDU in the RU remains the same.

Figure 7:
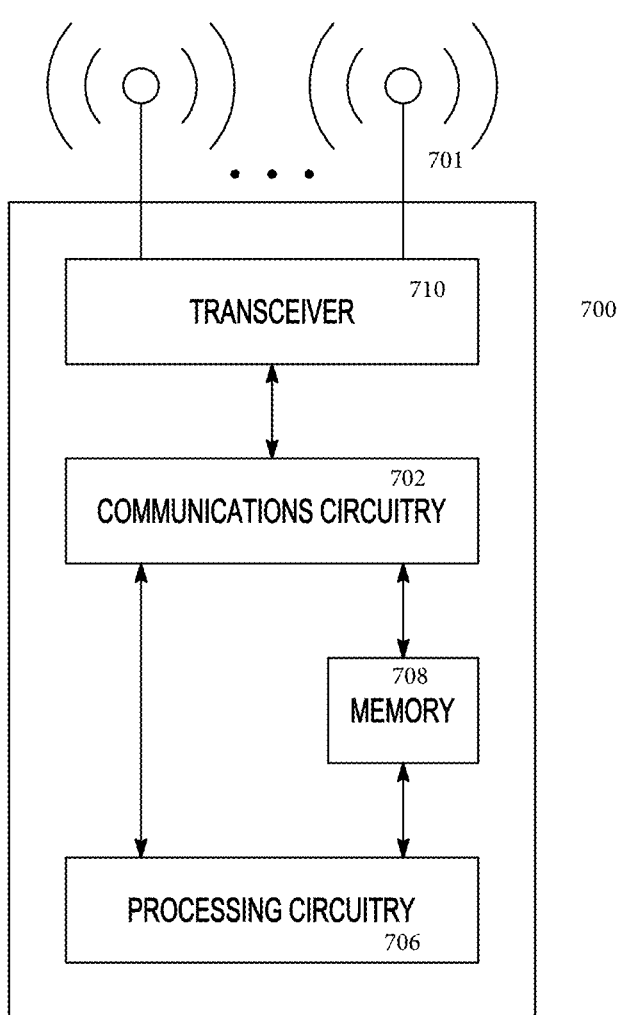
FIG. 7 illustrates a functional block diagram of a wireless communication device, in accordance with some embodiments.

FIG. 7 illustrates a functional block diagram of a wireless communication device, in accordance with some embodiments. In one embodiment, FIG. 7 illustrates a functional block diagram of a communication device (STA) that may be suitable for use as an AP STA, a non-AP STA or other user device in accordance with some embodiments. The communication device 700 may also be suitable for use as a handheld device, a mobile device, a cellular telephone, a smartphone, a tablet, a netbook, a wireless terminal, a laptop computer, a wearable computer device, a femtocell, a high data rate (HDR) subscriber device, an access point, an access terminal, or other personal communication system (PCS) device.

The communication device 700 may include communications circuitry 702 and a transceiver 710 for transmitting and receiving signals to and from other communication devices using one or more antennas 701. The communications circuitry 702 may include circuitry that can operate the physical layer (PHY) communications and/or medium access control (MAC) communications for controlling access to the wireless medium, and/or any other communications layers for transmitting and receiving signals. The communication device 700 may also include processing circuitry 706 and memory 708 arranged to perform the operations described herein. In some embodiments, the communications circuitry 702 and the processing circuitry 706 may be configured to perform operations detailed in the above figures, diagrams, and flows.

In accordance with some embodiments, the communications circuitry 702 may be arranged to contend for a wireless medium and configure frames or packets for communicating over the wireless medium. The communications circuitry 702 may be arranged to transmit and receive signals. The communications circuitry 702 may also include circuitry for modulation/demodulation, upconversion/downconversion, filtering, amplification, etc. In some embodiments, the processing circuitry 706 of the communication device 700 may include one or more processors. In other embodiments, two or more antennas 701 may be coupled to the communications circuitry 702 arranged for sending and receiving signals. The memory 708 may store information for configuring the processing circuitry 706 to perform operations for configuring and transmitting message frames and performing the various operations described herein. The memory 708 may include any type of memory, including non-transitory memory, for storing information in a form readable by a machine (e.g., a computer). For example, the memory 708 may include a computer-readable storage device, read-only memory (ROM), random-access memory (RAM), magnetic disk storage media, optical storage media, flash-memory devices and other storage devices and media.

In some embodiments, the communication device 700 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication device 700 may include one or more antennas 701. The antennas 701 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting device.

In some embodiments, the communication device 700 may include one or more of a keyboard, a display, a non-volatile memory port, multiple antennas, a graphics processor, an application processor, speakers, and other mobile device elements. The display may be an LCD screen including a touch screen.

Although the communication device 700 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication device 700 may refer to one or more processes operating on one or more processing elements.

Figure 8:
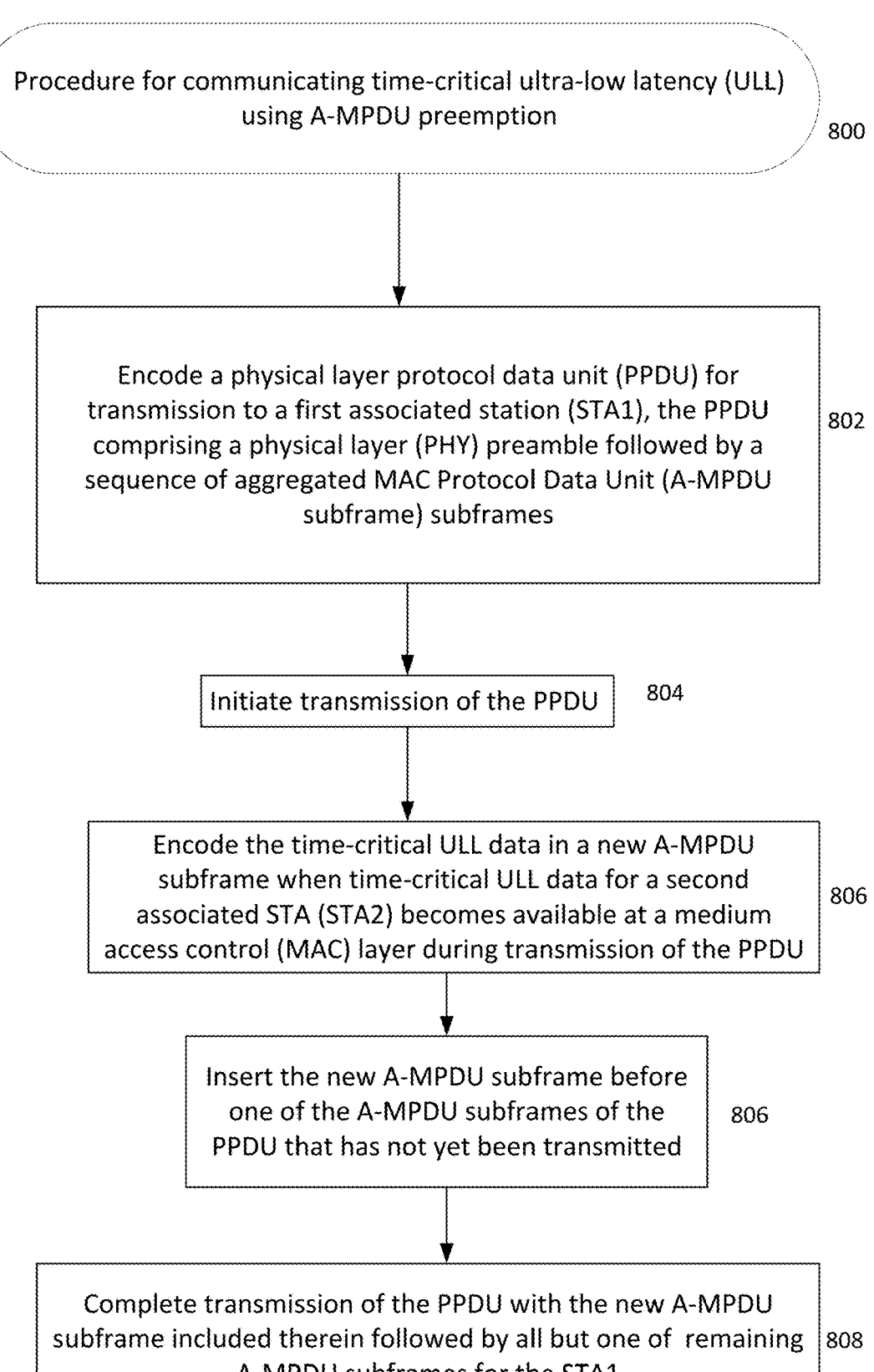
FIG. 8 illustrates a procedure for communicating time-critical ULL data using A-MPDU preemption, in accordance with some embodiments.

FIG. 8 illustrates a procedure for communicating time-critical ultra-low latency (ULL) data using A-MPDU preemption, in accordance with some embodiments. Procedure 800 may be performed by an access point station (AP), although this is not a requirement.

Operation 802 comprises encoding a physical layer protocol data unit (PPDU) for transmission to a first associated station (STA1). The PPDU may comprise a physical layer (PHY) preamble followed by a sequence of aggregated MAC Protocol Data Unit (A-MPDU subframe) subframes.

Operation 804 includes initiating transmission of the PPDU.

Operation 806 comprises encoding the time-critical ULL data in a new A-MPDU subframe when time-critical ULL data for a second associated STA (STA2) becomes available at a medium access control (MAC) layer during transmission of the PPDU.

Operation 808 comprises inserting the new A-MPDU subframe before one of the A-MPDU subframes of the PPDU that has not yet been transmitted.

Operation 809 comprises completing transmission of the PPDU with the new A-MPDU subframe included therein followed by all but one of remaining A-MPDU subframes for the STA1.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of an access point station (AP), the apparatus comprising: processing circuitry; and memory, wherein the processing circuitry is configured to:

encode a physical layer protocol data unit (PPDU) for transmission to a first associated station (STA1), the PPDU comprising a physical layer (PHY) preamble followed by a sequence of aggregated MAC Protocol Data Unit (A-MPDU subframe) subframes, initiate transmission of the PPDU;

wherein when time-critical ultra-low latency (ULL) data for a second associated STA (STA2) becomes available at a medium access control (MAC) layer after transmission of the PPDU has been initiated, the processing circuitry is configured to:

encode the time-critical ULL data in a new A-MPDU subframe, the new A-MPDU subframe encoded to include zero-padding to set a size of the new A-MPDU subframe equal to a size of a preempted one of the A-MPDU subframes when a size of the new A-MPDU subframe is less than a size of the preempted A-MPDU; and insert the new A-MPDU subframe before one of the A-MPDU subframes of the PPDU that has not yet been transmitted; and complete transmission of the PPDU without the preempted A-MPDU and with the new A-MPDU subframe included therein followed by remaining of the A-MPDU subframes for the STA1.

2. The apparatus of claim 1, wherein the processing circuitry is further configured to:

encode the PHY preamble to include association identifier (AID) of the STA1;

encode the A-MPDU subframes for the STA1 to include a MAC address of the STA1, and encode the new A-MPDU subframe for the STA2 to include a MAC address of the STA2.

3. The apparatus of claim 2, wherein the processing circuitry is further configured to:

encode the A-MPDU subframes for the STA1 and indicate ACK; and encode the new A-MPDU subframe for the STA2 and indicate NACK.

4. The apparatus of claim 3, wherein the processing circuitry is further configured to encode the new A-MPDU subframe using one or more physical layer (PHY) parameters indicated in a signal field (SIG) of the PHY preamble of the PPDU.

5. The apparatus of claim 4, wherein the PPDU is encoded as a single user (SU) PPDU for the STA1, wherein prior to initiating transmission of the PPDU to the STA1, the AP and the STA2 have established a time-sensitive networking application that includes communication of the time-critical ULL data therebetween, and wherein as part of establishment of the time-sensitive networking application, the AP has indicated to the STA2 to decode PPDUs for STA1 for time-critical ULL data for STA2.

6. The apparatus of claim 5, wherein the time-critical ULL data for the STA2 is received at the MAC layer from an application upper layer of the AP, wherein the processing circuitry is configured to initiate transmission of the PPDU to the STA1 when there is no time-critical ULL data available for the STA2 in a transmission queue, and wherein when the time-critical ULL data for the STA2 is received at the MAC layer from the application upper layer of the AP after transmission of the PPDU has been initiated, the processing circuitry is configured to delay one of the A-MPDU subframes for the STA1 and insert the new A-MPDU subframe in the PPDU that includes that the time-critical ULL data for the STA2.

7. The apparatus of claim 3, wherein the time-critical ULL data has a latency requirement of less than or equal to one millisecond (ms).

8. The apparatus of claim 7, wherein the processing circuitry is configured to:

insert the new A-MPDU subframe into the PPDU when transmission of the time-critical ULL data after transmission the PPDU would exceed the latency requirement; and refrain from inserting the new A-MPDU subframe when transmission of the time-critical ULL data after transmission the PPDU would not exceed the latency requirement.

9. The apparatus of claim 8, wherein after transmission of the PPDU is initiated and when the time-critical ULL data for the STA2 does not becomes available during transmission of the PPDU, the processing circuitry is configured to:

refrain from encoding the time-critical ULL data in the new A-MPDU subframe;

refrain from inserting the new A-MPDU subframe into the PPDU; and complete transmission of the PPDU with the A-MPDU subframes without the new A-MPDU subframe.

10. A non-transitory computer-readable storage medium that stores instructions for execution by processing circuitry of an access point station (AP), the processing circuitry is configured to:

encode a physical layer protocol data unit (PPDU) for transmission to a first associated station (STA1), the PPDU comprising a physical layer (PHY) preamble followed by a sequence of aggregated MAC Protocol Data Unit (A-MPDU subframe) subframes, initiate transmission of the PPDU;

wherein when time-critical ultra-low latency (ULL) data for a second associated STA (STA2) becomes available at a medium access control (MAC) layer after transmission of the PPDU has been initiated, the processing circuitry is configured to:

encode the time-critical ULL data in a new A-MPDU subframe, the new A-MPDU subframe encoded to include zero-padding to set a size of the new A-MPDU subframe equal to a size of a preempted one of the A-MPDU subframes when a size of the new A-MPDU subframe is less than a size of the preempted A-MPDU; and insert the new A-MPDU subframe before one of the A-MPDU subframes of the PPDU that has not yet been transmitted; and complete transmission of the PPDU without the preempted A-MPDU and with the new A-MPDU subframe included therein followed by remaining of the A-MPDU subframes for the STA1.

11. The non-transitory computer-readable storage medium of claim 10, wherein the processing circuitry is further configured to:

encode the PHY preamble to include association identifier (AID) of the STA1;

encode the A-MPDU subframes for the STA1 to include a MAC address of the STA1, and encode the new A-MPDU subframe for the STA2 to include a MAC address of the STA2.

12. The non-transitory computer-readable storage medium of claim 11, wherein the processing circuitry is further configured to:

encode the A-MPDU subframes for the STA1 and indicate ACK; and encode the new A-MPDU subframe for the STA2 and indicate NACK.

13. The non-transitory computer-readable storage medium of claim 12, wherein the processing circuitry is further configured to encode the new A-MPDU subframe using one or more physical layer (PHY) parameters indicated in a signal field (SIG) of the PHY preamble of the PPDU.

14. The non-transitory computer-readable storage medium of claim 13, wherein the PPDU is encoded as a single user (SU) PPDU for the STA1, wherein prior to initiating transmission of the PPDU to the STA1, the AP and the STA2 have established a time-sensitive networking application that includes communication of the time-critical ULL data therebetween, and wherein as part of establishment of the time-sensitive networking application, the AP has indicated to the STA2 to decode PPDUs for STA1 for time-critical ULL data for STA2.

15. The non-transitory computer-readable storage medium of claim 14, wherein the time-critical ULL data for the STA2 is received at the MAC layer from an application upper layer of the AP, wherein the processing circuitry is configured to initiate transmission of the PPDU to the STA1 when there is no time-critical ULL data available for the STA2 in a transmission queue, and wherein when the time-critical ULL data for the STA2 is received at the MAC layer from the application upper layer of the AP after transmission of the PPDU has been initiated, the processing circuitry is configured to delay one of the A-MPDU subframes for the STA1 and insert the new A-MPDU subframe in the PPDU that includes that the time-critical ULL data for the STA2.

16. An apparatus of a non-AP station (STA) (STA2), the apparatus comprising: processing circuitry; and memory, wherein for receiving time-critical ultra-low latency (ULL) data from an access point station (AP), the processing circuitry is configured to:

decode a physical layer protocol data unit (PPDU) for a first associated station (STA1), the PPDU comprising a PHY preamble followed by a sequence of aggregated MAC Protocol Data Unit (A-MPDU subframe) subframes, decode the A-MPDU subframes to determine if one of the A-MPDU subframes have a MAC address of the STA2, wherein the time-critical ULL data is encoded in the one A-MPDU subframe that has the MAC address of the STA2.

17. The apparatus of claim 16, wherein when the one of the A-MPDU subframes have the MAC address of the STA2, the processing circuitry is configured to further decode the A-MPDU subframe and provide the time-critical ULL data to an application layer of the STA2.

18. The apparatus of claim 17, wherein the processing circuitry is further configured to:

establish, with the AP, a time-sensitive networking application that includes communication of the time-critical ULL data therebetween, and wherein as part of the establishment of the time-sensitive networking application, the AP has indicated to the STA2 that PPDUs for STA1 may include A-MPDU subframes with a MAC address of the STA2 indicating the time-critical ULL data for STA2.

* * * * *